(12) United States Patent
Ezrielev et al.

(10) Patent No.: US 12,555,297 B2
(45) Date of Patent: Feb. 17, 2026

(54) PRESENTATION OF TOPIC INFORMATION USING ADAPTATIONS OF A VIRTUAL ENVIRONMENT

(71) Applicant: Dell Products L.P., Round Rock, TX (US)

(72) Inventors: Ofir Ezrielev, Be'er Sheba (IL); Or Herman Saffar, Ofakim (IL); John Lawrence Dalton, Austin, TX (US); Noga Gershon, Beer Sheva (IL)

(73) Assignee: Dell Products L.P., Round Rock, TX (US)

(*) Notice: Subject to any disclaimer, the term of this patent is extended or adjusted under 35 U.S.C. 154(b) by 325 days.

(21) Appl. No.: 18/110,055

(22) Filed: Feb. 15, 2023

(65) Prior Publication Data
US 2024/0273800 A1     Aug. 15, 2024

(51) Int. Cl.
*G06T 15/00*     (2011.01)
*G06F 40/35*     (2020.01)
*G06F 40/40*     (2020.01)

(52) U.S. Cl.
CPC .............. *G06T 15/00* (2013.01); *G06F 40/35* (2020.01); *G06F 40/40* (2020.01)

(58) Field of Classification Search
CPC .......... G06F 40/40; G06F 40/35; G06T 15/00
See application file for complete search history.

(56) References Cited

U.S. PATENT DOCUMENTS

| 2004/0162724 | A1* | 8/2004 | Hill | G10L 15/22 704/231 |
| 2012/0242842 | A1* | 9/2012 | Yoshigahara | G06V 30/142 348/207.1 |
| 2013/0187835 | A1* | 7/2013 | Vaught | G06F 3/011 345/7 |

(Continued)

OTHER PUBLICATIONS

Fitton et al.; "Immersive Virtual Environments and Embodied Agents for e-Learning Applications"; PeerJ Comput Sci. 6:e315 DOI 10.7717/peerj-cs.315; (2020).

(Continued)

*Primary Examiner* — Michelle L Sams
(74) *Attorney, Agent, or Firm* — Ryan, Mason & Lewis, LLP

(57) ABSTRACT

Techniques are provided for presentation of topic information using adaptations of a virtual environment. One method comprises obtaining session information characterizing a session of a virtual environment, wherein the session information comprises a topic of the session; automatically extracting information related to the topic of the session from a database associated with an organization; generating an adaptation of the session of the virtual environment, wherein the adaptation comprises at least some of the extracted information related to the topic of the session; and automatically initiating an update of a rendering of the virtual environment using the generated adaptation of the session of the virtual environment. User-specific information may be presented to a given user using an adaptation of (Continued)

the virtual environment. The rendering of the virtual environment using the generated adaptation may be provided only to a given user of a plurality of users.

20 Claims, 21 Drawing Sheets

(56) References Cited

U.S. PATENT DOCUMENTS

| | | | |
|---|---|---|---|
| 2015/0281649 A1* | 10/2015 | Ehmann | G06F 3/1454 |
| | | | 348/14.07 |
| 2019/0182382 A1* | 6/2019 | Mazza | H04M 3/527 |
| 2020/0301504 A1* | 9/2020 | Williams | G06F 3/013 |
| 2023/0144091 A1* | 5/2023 | Forutanpour | G06F 3/013 |
| | | | 345/156 |

OTHER PUBLICATIONS

Mayer et al.; "Learning in a Game-Based Virtual Environment: A Comparative Evaluation in Higher Education"; European Journal of Engineering Education; (Mar. 2013).

Peterson, Mark; "Learning Interaction in an Avatar-Based Virtual Environment: A Preliminary Study"; PacCALL Journal vol. 1 No. 1 pp. 29-40; Summer 2005.

* cited by examiner

GENETIC ALGORITHM 800 FOR UPDATING VE OBJECTS

INPUT: *Fitness* {function that assigns an evaluation score, given a test goal}
INPUT: *Fitness_threshold* {threshold specifying a termination criterion}
INPUT: *Max_generation* {optional threshold specifying the termination criterion if *Fitness_threshold* can't be exceeded}
INPUT: *p* {number of individual VE objects to be included in population}
INPUT: *r* {fraction of the population to be replaced by Crossover at each step}
INPUT: *m* {mutation rate}
INPUT: *P0* {Manually created VE objects, or VE objects automatically generated by previous testing}
{Initialize population}
$P <=$ randomly add $p$ VE objects, selected from *P0*
{Execute/Evaluate}
For each element in *P* do
   If element has not been executed and evaluated do
      Execute(element)
      Compute *Fitness* (element)
   End if
End for
While max (*Fitness* (element) less than *Fitness_threshold* do
   {Create new generation $P_s$}
   1. Select: fitness proportionate select $(1 - r)(p)$ members of *P* to add to $P_s$
   2. Crossover: Probabilistically select $(r \times p)/2$ pairs of elements from *P*.
      a. For each pair, produce two offspring by applying the Crossover operator.
      b. Add all offspring to $P_s$
   3. Mutate: Choose *m* percent of the members of $P_s$ with uniform probability.
      a. For each, invert one randomly selected mutable bit in its representation.
   4. Update: $P \leftarrow P_s$
   5. Execute and Evaluate
   For each element in *P* do
      Execute(element)
      Compute *Fitness* (element)
   End for
End while
{Persist all elements in *P* to Library}

FIG. 8

PRESENTATION OF TOPIC INFORMATION USING ADAPTATIONS OF A VIRTUAL ENVIRONMENT

FIELD

The field relates generally to information processing systems and more particularly, to user monitoring techniques in such information processing systems.

BACKGROUND

Remote users are increasingly engaging in virtual environments that employ virtual reality (VR) and/or augmented reality (AR) techniques. There are a number of challenges, however, that need to be addressed in order for such virtual environments to successfully engage users. The consistent engagement of users with the content presented in a virtual environment, for example, is often hard to achieve and maintain.

SUMMARY

In one embodiment, a method comprises obtaining, from one or more users, session information characterizing a session of a virtual environment, wherein the session information comprises one or more topics of the session; automatically extracting information related to the one or more topics of the session from one or more databases associated with an organization; generating at least one adaptation of the session of the virtual environment, wherein the at least one adaptation comprises at least some of the extracted information related to the one or more topics of the session; and automatically initiating an update of a rendering of the virtual environment using the generated at least one adaptation of the session of the virtual environment.

In some embodiments, the one or more databases associated with the organization comprise a database of historical conversations in one or more virtual environments and wherein the automatically extracting comprises converting at least some of the historical conversations to text to obtain corresponding textual representations of the at least some of the historical conversations. A document classifier employing one or more artificial intelligence techniques may be applied to the textual representations of the at least some of the historical conversations to classify the textual representations of the at least some of the historical conversations as comprising one of technical content and personal content. The rendering of the virtual environment using at least some of the extracted information may employ a first treatment of the extracted information that is classified as technical content and a second treatment of the extracted information that is classified as personal content. The second treatment of the extracted information that is classified as personal content may comprise only presenting personal content, to one or more given users, of a plurality of users, that is based on historical conversations where the one or more given users were a participant.

In one or more embodiments, user-specific information may be presented to one or more users using at least one adaptation of the virtual environment. The rendering of the virtual environment using the generated at least one adaptation of the session of the virtual environment may be provided only to a given user of a plurality of users.

Other illustrative embodiments include, without limitation, apparatus, systems, methods and computer program products comprising processor-readable storage media.

BRIEF DESCRIPTION OF THE DRAWINGS

FIG. 8 illustrates exemplary pseudo code for a genetic algorithm for updating virtual environment objects in accordance with an illustrative embodiment;

DETAILED DESCRIPTION

Figure 1:
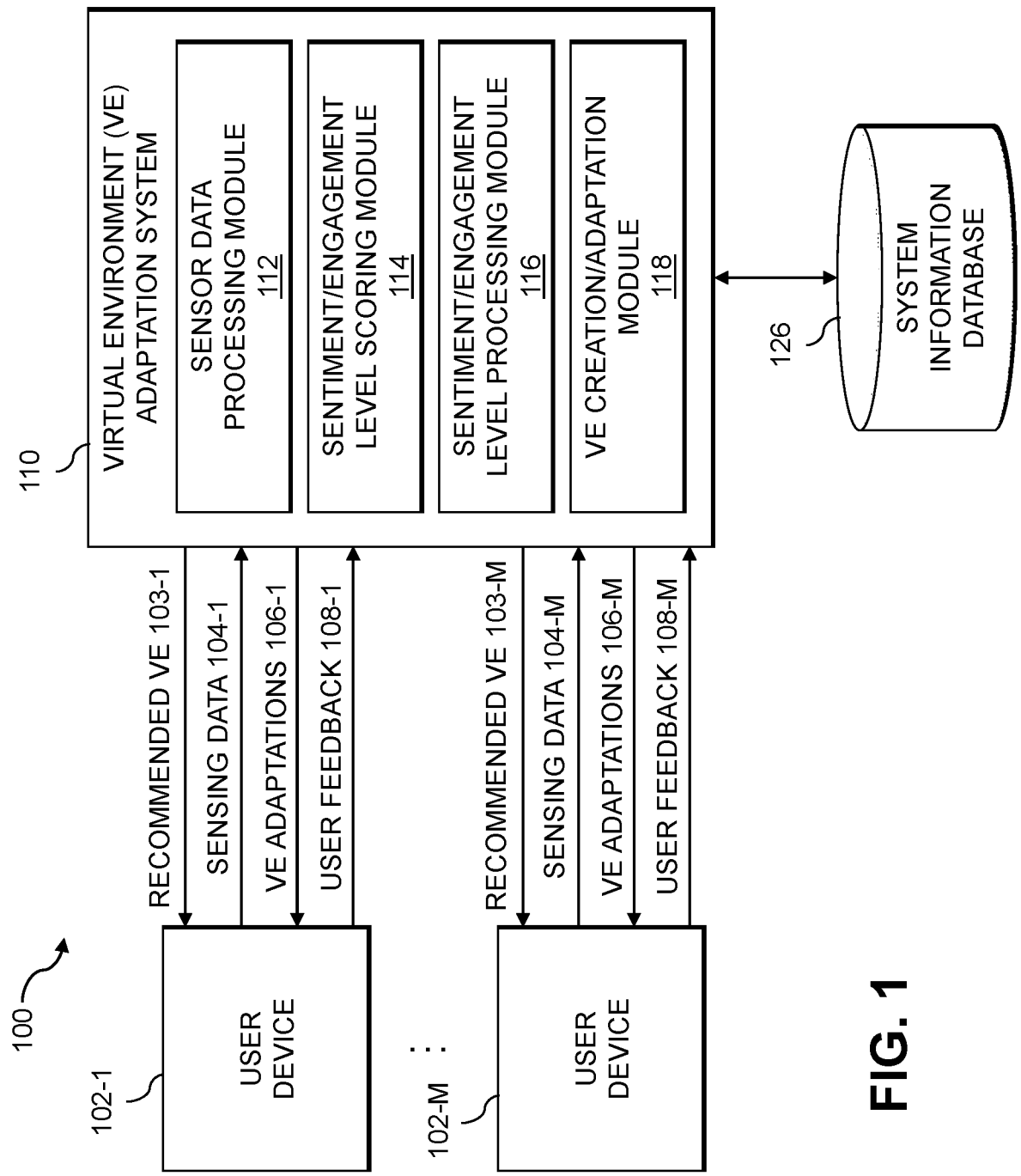
FIG. 1 illustrates an information processing system configured for adapting a virtual environment in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adapting a virtual environment.

In one or more embodiments, techniques are provided for adapting a virtual environment in response to measured sentiment and/or engagement of a remote user. Sensing data (such as Internet of Things (IoT) sensor data) related to one or more remote users of a virtual environment can be applied to the disclosed virtual environment adaptation system (comprising, for example, one or more analytics algorithms, such as machine learning (ML) algorithms, artificial intelligence (AI) techniques, computer vision (CV) algorithms and/or data analytics algorithms) to obtain a real-time measurement of a sentiment and/or engagement level for each remote user. A sentiment of each remote user characterizes the opinions of an individual to find his or her attitude towards a topic. An engagement level of each remote user comprises the level of attention and/or interaction between a remote user and the presented content in a virtual environment.

The measured sentiment and/or engagement level of each user can be used to initiate a virtual environment adaptation signal to those users having, for example, a negative sentiment and/or a low engagement level (e.g., below specified thresholds or relative to a sentiment or an engagement level of a group of peers or for the current virtual environment scenario), as discussed further below, and/or to provide a visualization of the measured user sentiment or engagement level to one or more monitoring users. The virtual environment adaptation signal can be sent automatically by the disclosed virtual environment adaptation system or manually by a monitoring user as a stimulus signal or an alert.

The disclosed virtual environment adaptation techniques enable a more intelligent management of users and an increased sentiment and/or engagement level of the virtual experience. In at least some embodiments, the disclosed virtual environment adaptation techniques provide a number of technical solutions. For example, a sentiment or an engagement level of a particular user can be measured by applying sensing data related to the particular user to an analytics engine, and a virtual environment adaptation signal can be automatically provided to the user to improve an effectiveness of the virtual experience when the measured sentiment or engagement level falls below a specified threshold or otherwise deviates from one or more specified criteria. In addition, the virtual environment adaptation signal can be used to improve the interaction between a monitoring user and one or more other remote users.

In at least some embodiments, the disclosed virtual environment adaptation system provides a technical solution that allows a remote monitoring user to measure a sentiment or an engagement level of another user in real time and allows such remote monitoring users (or the automated system) to promptly take action (for example, in response to the sentiment of a user becoming a negative sentiment or the measured engagement level of a user indicating that the user has become distracted).

In one or more embodiments, the disclosed techniques for virtual environment adaptation employ computer vision techniques to collect and evaluate real-time user behavior information, such as eye movement, body position (e.g., slouching or sitting up), and facial expression (e.g., yawning, frowning, or squinting eyes). The collected data can be processed to obtain an engagement level and/or sentiment of one or more users and to initiate immediate intervention and/or reflective actions.

At least some aspects of the disclosure recognize that users may be less engaged in virtual environments than in conventional in-person environments because interactions between remote users are reduced due to distance. The lack of physical proximity between remote users in a virtual environment decreases the rich communication and other dynamics that encourage users to participate consistently and that allow each user to assess the sentiment and/or engagement of other users.

In a physical environment, participants can more easily identify when another session participant is bored, stressed, or distracted, for example, by evaluating the body language and facial expression of participants to obtain an immediate assessment of each participant's sentiment and/or engagement status. In a remote virtual environment, however, it is difficult for participants to evaluate and assess the engagement level of other participants remotely.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more virtual environment adaptation systems 110 and a system information database 126, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). Such devices are examples of what are more generally referred to herein as "processing devices." Some of these processing devices are also generally referred to herein as "computers." The user devices 102 may comprise a network client that includes networking capabilities such as ethernet, Wi-Fi, etc. The user devices 102 may be implemented, for example, by participants in a virtual environment session, such as one or more target users and one or more session leaders or monitors.

One or more of the user devices 102 and the virtual environment adaptation system 110 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, such as avatar representations of a human, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of edge devices, or a stand-alone computing and storage system implemented within a given enterprise.

One or more of the user devices 102 and the virtual environment adaptation system 110 illustratively comprise processing devices of one or more processing platforms. For example, the virtual environment adaptation system 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the user devices 102 and the virtual environment adaptation system 110 can additionally or alternatively be part of cloud infrastructure such as an Amazon Web Services (AWS) system. Other examples of cloud-based systems that can be used to provide at least portions of the user devices 102 and/or the virtual environment adaptation system 110 include Google Cloud Platform (GCP) and Microsoft Azure.

In the example of FIG. 1, each user device 102-1 through 102-M receives a recommended virtual environment (VE) 103-1 through 103-M, collectively referred to herein as recommended VE 103, from the virtual environment adaptation system 110 for the respective user. In addition, each user device 102-1 through 102-M provides corresponding sensing data 104-1 through 104-M, collectively referred to herein as sensing data 104, associated with the respective user. For example, the sensing data 104 may be generated by IoT sensors near the respective users that can be used for data collection, including physiological data, motion and emotion. The sensors could be embedded with existing user devices 102, such as graspable and touchable user devices (e.g., computer, monitor, mouse, keyboards, smart phone and/or AR/VR headsets). The sensors may also be implemented as part of laptop computer devices, smart mobile devices or wearable devices on the body of a user, such as cameras, physiological sensors and smart watches.

In addition, each user device 102-1 through 102-M can receive VE adaptations 106-1 through 106-M, collectively referred to herein as VE adaptations 106, from the virtual environment adaptation system 110. The VE adaptations 106 can be initiated, for example, to provide specific information to a respective user (e.g., topic summaries) and/or to stimulate the respective user if the respective user is detected to have a different sentiment or level of engagement than usual.

Further, each user device 102 can provide user feedback 108-1 through 108-M, collectively referred to herein as user feedback 108, to the virtual environment adaptation system 110 indicating, for example, an accuracy of the measured sentiment or engagement level of the respective user (e.g., to fine tune an analytics engine associated with the virtual environment adaptation system 110), special circumstances associated with the respective user and/or feedback regarding particular recommendations made by the virtual environment adaptation system 110 in the form of VE adaptations 106.

In some embodiments, users can receive or request their measured sentiment or engagement level from the virtual environment adaptation system 110, and provide the user feedback 108 back to the virtual environment adaptation system 110 indicating whether the measured sentiment or engagement levels are accurate, thereby providing a closed loop learning system. The user feedback 108 indicating the accuracy of the measured sentiment or engagement levels can be used to train and/or retrain one or more models employed by the analytics engine, as discussed further below in conjunction with FIG. 3.

In some embodiments, each user device 102 can receive additional feedback from the virtual environment adaptation system 110 based at least in part on the sentiment or engagement level of the respective user with the virtual environment. For example, the VE adaptations 106 for a given user may comprise a voice signal, a noise signal and/or virtual characters in an AR/VR device, or a combination of the foregoing, to provide targeted information, an alert and/or warning to the given user during a virtual environment session.

The VE adaptations 106 can be automatically generated (optionally with voice messages, noise, virtual characters in AR/VR devices and/or other feedback) if users are detected to have a negative sentiment or to be distracted (e.g., when the measured engagement level falls below a threshold or deviates from another criteria). For example, a voice message can ask if a user needs assistance during a virtual environment session, when the sentiment or engagement level of the user falls below a threshold or indicates that the user is stressed or uninterested, for example. The VE adaptations 106 could be specifically designed based on different scenarios.

In addition, a monitoring user (e.g., a session leader, sales representative or a project manager) can manually make a selection regarding other session participants (e.g., target users, such as customers), and select the type of VE adaptations 106 to send. For example, the monitoring user can click a button next to an image of another other session participant to manually initiate VE adaptations 106 (and/or a preassigned voice message) to a particular user.

As shown in FIG. 1, the exemplary virtual environment adaptation system 110 comprises a sensor data processing module 112, a sentiment/engagement level scoring module 114, a sentiment/engagement level processing module 116 and a VE creation/adaptation module 118, as discussed further below. In one or more embodiments, the sensor data processing module 112 may be used to collect sensor data (e.g., sensing data 104) and to optionally perform one or more (i) pre-processing tasks, (ii) face and body detection tasks and/or (iii) hand and/or head tracking tasks to prepare the sensor data for further processing by an analytics engine, as discussed further below in conjunction with FIG. 2. The sentiment/engagement level scoring module 114 evaluates the collected sensor data and determines a sentiment and/or an engagement level of one or more remote users interacting with a virtual environment. The exemplary sentiment/engagement level processing module 116 evaluates the sentiment and/or engagement level determined by the sentiment/engagement level scoring module 114 and may initiate one or more VE adaptations 106 to one or more of the user devices 102 based at least in part on the measured sentiment and/or an engagement level of a given user. The VE creation/adaptation module 118 generates the recommended VE 103 and/or one or more VE adaptations 106, as discussed further below, for example, in conjunction with FIGS. 5 through 7, 9, 12, 14 and 16.

It is to be appreciated that this particular arrangement of modules 112, 114, 116, 118 illustrated in the virtual environment adaptation system 110 of the FIG. 1 embodiment is presented by way of example only, and alternative arrangements can be used in other embodiments. For example, the functionality associated with modules 112, 114, 116, 118 in other embodiments can be combined into a single module, or separated across a larger number of modules. As another example, multiple distinct processors and/or memory elements can be used to implement different ones of modules 112, 114, 116, 118 or portions thereof. At least portions of modules 112, 114, 116, 118 may be implemented at least in part in the form of software that is stored in memory and executed by a processor.

The virtual environment adaptation system 110 may further include one or more additional modules and other components typically found in conventional implementations of such devices, although such additional modules and other components are omitted from the figure for clarity and simplicity of illustration.

In the FIG. 1 embodiment, the virtual environment adaptation system 110 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the virtual environment adaptation system 110 to reside in different data centers. Numerous other distributed implementations of the components of the system 100 are possible.

As noted above, the virtual environment adaptation system 110 can have an associated system information database 126 configured to store information related to one or more of the user devices 102, such as AR and/or VR capabilities, user preference information, static virtual environment topologies and a virtual object datastore. Although the system information is stored in the example of FIG. 1 in a single system information database 126, in other embodiments, an additional or alternative instance of the system information database 126, or portions thereof, may be incorporated into the virtual environment adaptation system 110 or other portions of the system 100.

The system information database 126 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the virtual environment adaptation system 110 can be one or more input/output devices (not shown), which illustratively comprise keyboards, displays or other types of input/output devices in any combination. Such input/output devices can be used, for example, to support one or more user interfaces to a user device 102, as well as to support communication between the virtual environment adaptation system 110 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for virtual environment adaptation is presented by way of illustrative example only, and in other embodiments additional or alternative elements may be used. Thus, another embodiment includes additional or alternative systems, devices and other network entities, as well as different arrangements of modules and other components.

Figure 2:
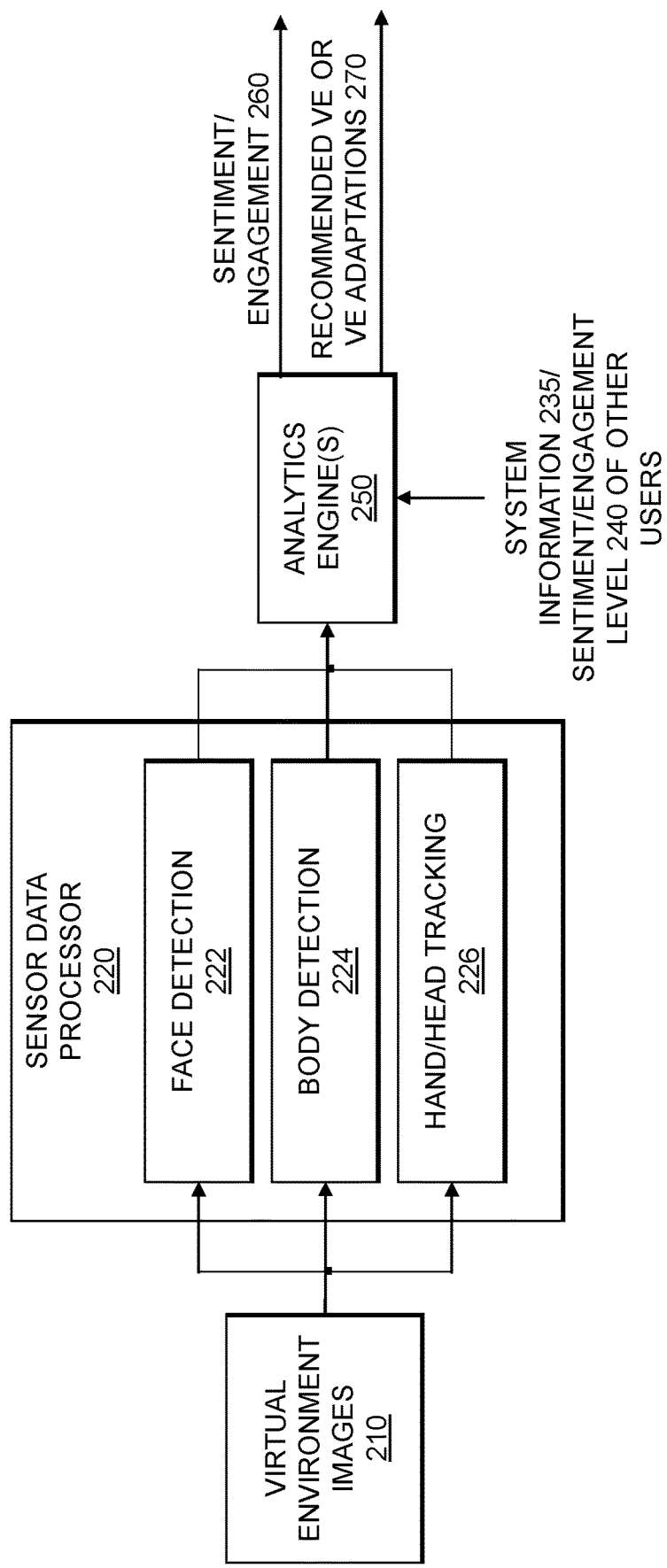
FIG. 2 illustrates a sensor data processor and an analytics engine for adapting a virtual environment in accordance with an illustrative embodiment.

FIG. 2 illustrates a sensor data processor 220 and an analytics engine for generating and adapting a virtual environment according to one or more embodiments. In the example of FIG. 2, one or more virtual environment images 210 obtained from the virtual environment in the vicinity of a remote user are applied to the sensor data processor 220. The exemplary sensor data processor 220 comprises a face detection module 222, a body detection module 224 and a hand/head tracking module 226. In one or more embodiments, the face detection module 222 may be used to detect the face of the remote user in the obtained images, the body detection module 224 may be used to detect the body (and/or body position) of the remote user in the obtained images (or an avatar or another virtual representation of the remote user), and the hand/head tracking module 226 may be used to track the position and/or movement of the hand and/or head of the remote user.

It is to be appreciated that this particular arrangement of modules 222, 224, 226 illustrated in the sensor data processor 220 of the FIG. 2 embodiment is presented by way of example only, and alternative arrangements can be used in other embodiments. For example, the functionality associated with modules 222, 224, 226 in other embodiments can be combined into a single module, or separated across a larger number of modules. As another example, multiple distinct processors and/or memory elements can be used to implement different ones of modules 222, 224, 226 or portions thereof. At least portions of modules 222, 224, 226 may be implemented at least in part in the form of software that is stored in memory and executed by a processor.

The sensor data processor 220 may further include one or more additional modules and other components typically found in conventional implementations of such devices, although such additional modules and other components are omitted from the figure for clarity and simplicity of illustration.

The signals generated by the face detection module 222, the body detection module 224 and the hand/head tracking module 226 are applied to an analytics engine 250, along with optional system information 235 and a sentiment/engagement level 240 of other users. The sentiment/engagement level 240 comprises a sentiment status and/or an engagement status of the other users. The applied system information 235 may comprise, for example, a characterization of the participation of one or more remote users in a virtual environment session (e.g., engaged time; a characterization of the interactions of one or more of the remote users with the presented content in a virtual environment session, or with a session leader; questions asked by the session leader (or answered by one or more of the session participants); times that the session participants participated in discussions in the virtual environment session; sensing data (e.g., face/gaze detection and/or motion (e.g., body, hand and/or head movements); and physiological data (such as heartrate, temperature and blood pressure), if shared.

In one or more embodiments, the analytics engine 250 analyzes the applied input signals to generate the measured sentiment/engagement level 260 of a particular session participant and to generate a recommended VE or recommended VE adaptations 270. The analytics engine 250 may compare the measured data of a particular session participant to (i) a baseline measurement for the session participant, (ii) typical session participants with similar profiles, and/or (iii) a larger group as a whole (e.g., using the sentiment/engagement level 240 of other session participants). The session participants that are used as a reference group may comprise a sufficient number of session participants having different characteristics in order to take actions based on comparisons with larger groups of session participants.

The exemplary analytics engine 250 may employ one or more machine learning models (e.g., neural networks and/or federated learning schemes). Among other benefits, such federated learning schemes address privacy concerns when the source data comes from multiple sources. The one or more machine learning models may comprise newly developed machine learning models and/or existing publicly available machine learning models that are based on a detailed use case. In some embodiments, the machine learning models may be trained on a dataset that is as unbiased as possible, for example, by ensuring that many different types of session participants are included in the training data. The training data may be labeled with a classification indicating the sentiment/engagement level of the session participants in the training data. During the training phase, the machine learning model learns to output a sentiment/engagement level.

The measurement during the training phase may measure a sentiment/engagement level of one or more session participants in real time. The result is a feedback loop where the analytics engine 250 can be continuously improved to best measure the sentiment/engagement level of a given session participant. The session participants can provide user feedback 108 indicating whether their sentiment/engagement levels are accurately portrayed. This could be done via ratings systems, for example, and could also be initiated if the given session participant is detected to have a different level sentiment/engagement than usual for the current virtual environment scenario.

Figure 3:
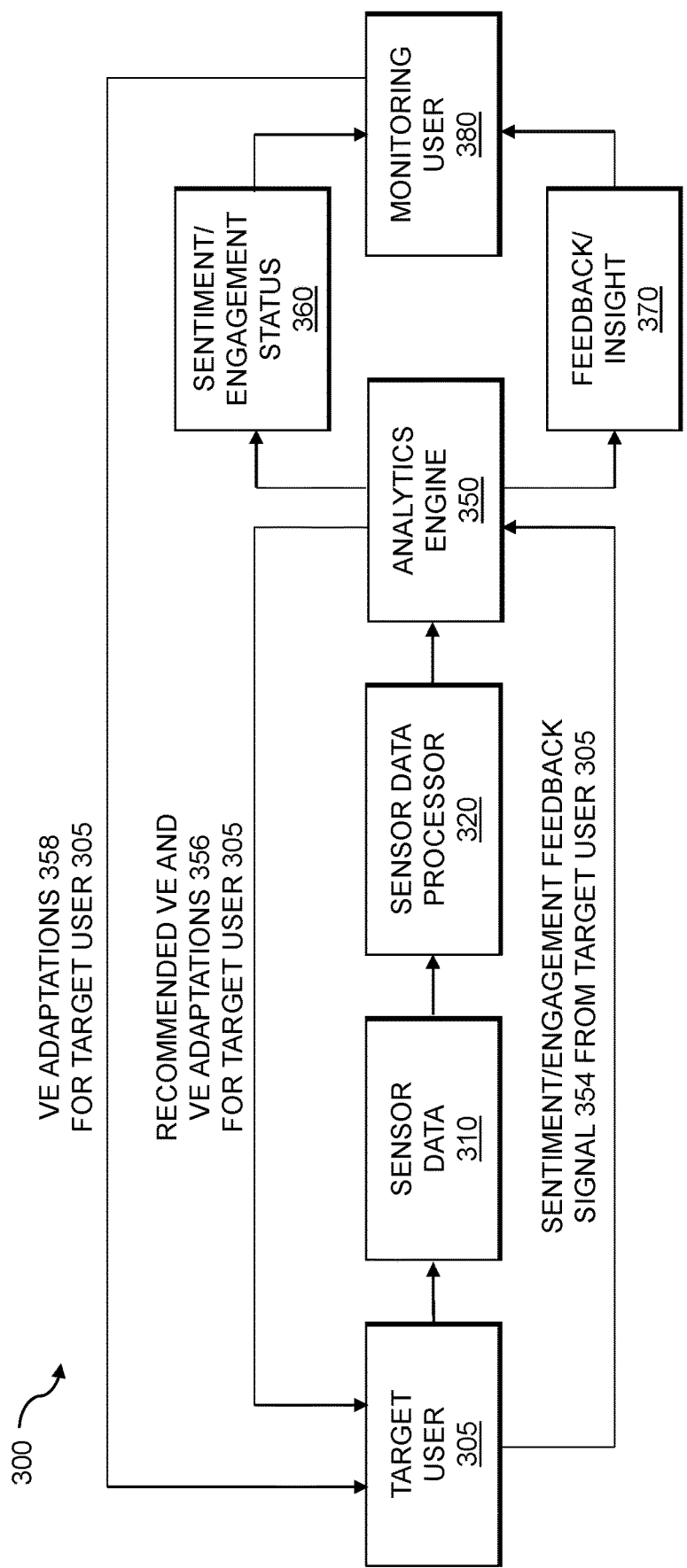
FIG. 3 illustrates an exemplary system architecture for adapting a virtual environment in accordance with an illustrative embodiment.

FIG. 3 illustrates an exemplary system architecture 300 for adapting a virtual environment, according to one embodiment of the disclosure. In the example of FIG. 3, sensor data 310, such as audio and/or video signals, related to a target user 305 is processed by a sensor data processor 320. The sensor data processor 320 may be implemented in a similar manner as the sensor data processor 220 of FIG. 2. The sensor data processor 320 generates one or more signals that are applied to an analytics engine 350. The analytics engine 350 may be implemented in a similar manner as the analytics engine 250 of FIG. 2.

The exemplary analytics engine 350 analyzes the applied input signals from the sensor data processor 320, as well as a sentiment/engagement feedback signal 354 from the target user 305 indicating whether the measured sentiment/engagement level is accurate and/or whether the VE adaptations generated for the target user are suitable for this particular target user 305. The exemplary analytics engine 350 may send a recommended VE and/or one or more VE adaptations 356 to the particular target user 305, for example, when the measured sentiment/engagement level of the particular target user 305 falls below a specified threshold, or otherwise deviates from a baseline behavior. As noted above, the generated recommended VE and/or one or more VE adaptations 356 may take particular characteristics and/or preferences of the target user 305 into account. The sentiment/engagement feedback signal 354 from the target user 305 provides a mechanism to allow the particular target user 305 (or another trusted user, such as a session leader) to provide feedback.

The exemplary analytics engine 350 may also generate (i) a measured sentiment/engagement status 360 of each target user 305 that is provided to a monitoring user 380 (e.g., a session leader, a sales representative or a project manager); and/or (ii) feedback/insights 370 that is provided to the monitoring user 380, as discussed hereinafter.

In the example of FIG. 3, the monitoring user 380 may manually initiate one or more VE adaptations 358 being sent to the target user 305, for example, when the monitoring user 380 observes or otherwise suspects that the particular target user 305 is not currently engaged with the presented content in a given virtual environment session. The one or more VE adaptations 358 may be sent in a similar manner as the recommended VE and/or one or more VE adaptations 356.

A dashboard can be employed to indicate the measured sentiment/engagement status 360 of each particular target user 305. The monitoring user 380 can thus have an immediate view and understanding of each user's engagement status during a given virtual environment session, and make an adjustment of presented content or style, and/or send one or more guiding signals, warnings or alerts accordingly. Thus, in some embodiments, the monitoring user 380 may manually initiate a VE adaptation signal comprising one or more VE adaptations 358 to a target user 305.

Figure 4:
FIG. 4 is a sample table illustrating a number of exemplary sensor types in accordance with an illustrative embodiment.

FIG. 4 is a sample table 400 illustrating a number of exemplary sensor types that may generate the sensor data 310 of FIG. 3, according to various embodiments. In the example of FIG. 4, presence sensors can be used to detect a presence of one or more users; position sensors can be used to detect a location of one or more users; physiological sensors can be used to collect real time data that reflect the real time physical status of session participants; cameras and/or motion sensors can be used to evaluate the hand, face, emotion and/or body of one or more session participants; a microphone can be used to evaluate a voice of one or more session participants; a camera signal can be used to perform gaze detection, eye tracking, emotion detection, facial recognition, and/or presence detection of one or more session participants; and a gyroscope sensor can be used to monitor the movement of the hands and/or head of one or more session participants. Computer vision algorithms can optionally enhance the ability to detect, measure, and respond to behaviors and engagement of session participants, which could be further used to provide session leaders, for example, with relevant feedback.

In one or more embodiments, discussed hereinafter, a virtual environment can be generated using a virtual environment development tool, such as an Unreal Engine three-dimensional virtual environment creation tool, commercially available from Epic Games, Inc. In various embodiments, a virtual environment can be generated: (i) manually, for example, by a subject matter expert that creates the virtual environment directly using the three-dimensional creation tool; (ii) in a semi-automated manner, whereby a set of virtual environment topologies exists, and an artificial intelligence model is trained to recommend the virtual environment (from among the set of virtual environment topologies) for each user and kind of prospective session; (iii) in a semi-automated manner with a fine-tuning process, whereby a set of virtual environment topologies exists, and an artificial intelligence model is trained to recommend the virtual environment (from among the set of virtual environment topologies) for and the fine-tuning process is applied to the selected virtual environment topology to better fit the user and kind of prospective session; and (iv) in an automated manner based on information that exists for one or more of the session participants and/or a particular session. In some embodiments, the generated virtual environment may be adapted in real-time during a given virtual environment session in accordance with, for example, the topics discussed, the virtual objects presented and a real-time sentiment and/or engagement level of one or more of the session participants.

Figure 5:
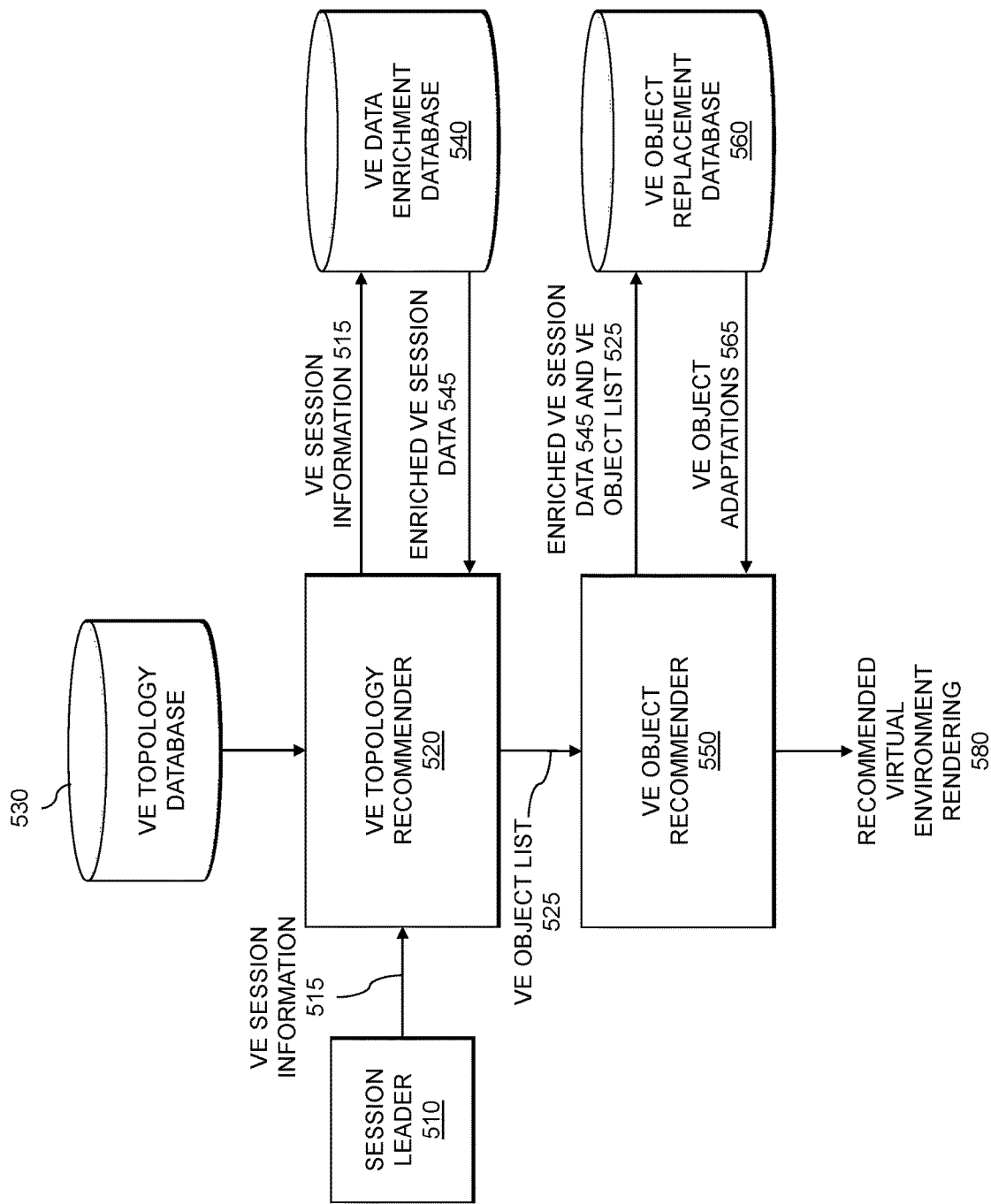
FIGS. 5 through 7 illustrate a rendering of various virtual environments in accordance with illustrative embodiments.

FIG. 5 illustrates a rendering of a virtual environment based on one or more virtual environment object adaptations in accordance with an illustrative embodiment. In the example of FIG. 5, a session leader 510 (or another user) provides virtual environment session information 515 characterizing various aspects of a given virtual environment session. A virtual environment topology recommender 520 processes the virtual environment session information 515 and provides the virtual environment session information 515 to a virtual environment data enrichment database 540. The virtual environment data enrichment database 540 returns enriched virtual environment session data 545 to the virtual environment topology recommender 520 that, for example, expands data related to one or more of the session participants and/or a topic of a particular virtual environment session. In this manner, the quality of the data and features processed by the virtual environment topology recommender 520 is improved and the quality of the recommendations made by the virtual environment topology recommender 520 will likewise be improved.

In addition, the virtual environment topology recommender 520 recommends (e.g., selects) a general virtual environment topology from a set of available virtual environment topologies in a virtual environment topology database 530, based at least in part on the virtual environment session information 515 and the enriched virtual environment session data 545. The virtual environment topology recommender 520 generates a virtual environment object list 525 based on the objects in the recommended virtual environment topology. The virtual environment topology recommender 520 may be implemented, for example, using a machine learning model, a collaborative filter (e.g., that provides recommendations based on similarities between session participants or other users and items or objects in a virtual environment session) and/or a neural network.

The virtual environment topology recommender 520 provides the virtual environment object list 525 to a virtual environment object recommender 550 that provides the enriched virtual environment session data 545 and the virtual environment object list 525 to a virtual environment object replacement database 560 that validates the virtual environment object list 525 and generates one or more virtual environment object adaptations 565 to replace generic objects in the virtual environment object list 525 with objects that are specifically selected using the virtual environment session information 515 and/or the enriched virtual environment session data 545. The virtual environment object recommender 550 initiates a recommended virtual environment rendering 580 using the recommended virtual environment topology as modified by the virtual environment object adaptations 565. A rendering is typically generated locally to each session participant. In the case of resource-constrained devices, the rendering can be pushed from another device, such as a cloud-based rendering device. As used herein, the term "rendering," or variations thereof, is intended to be broadly construed so as to encompass the generation or display of content or causing the generation or display of such content.

Figure 6:
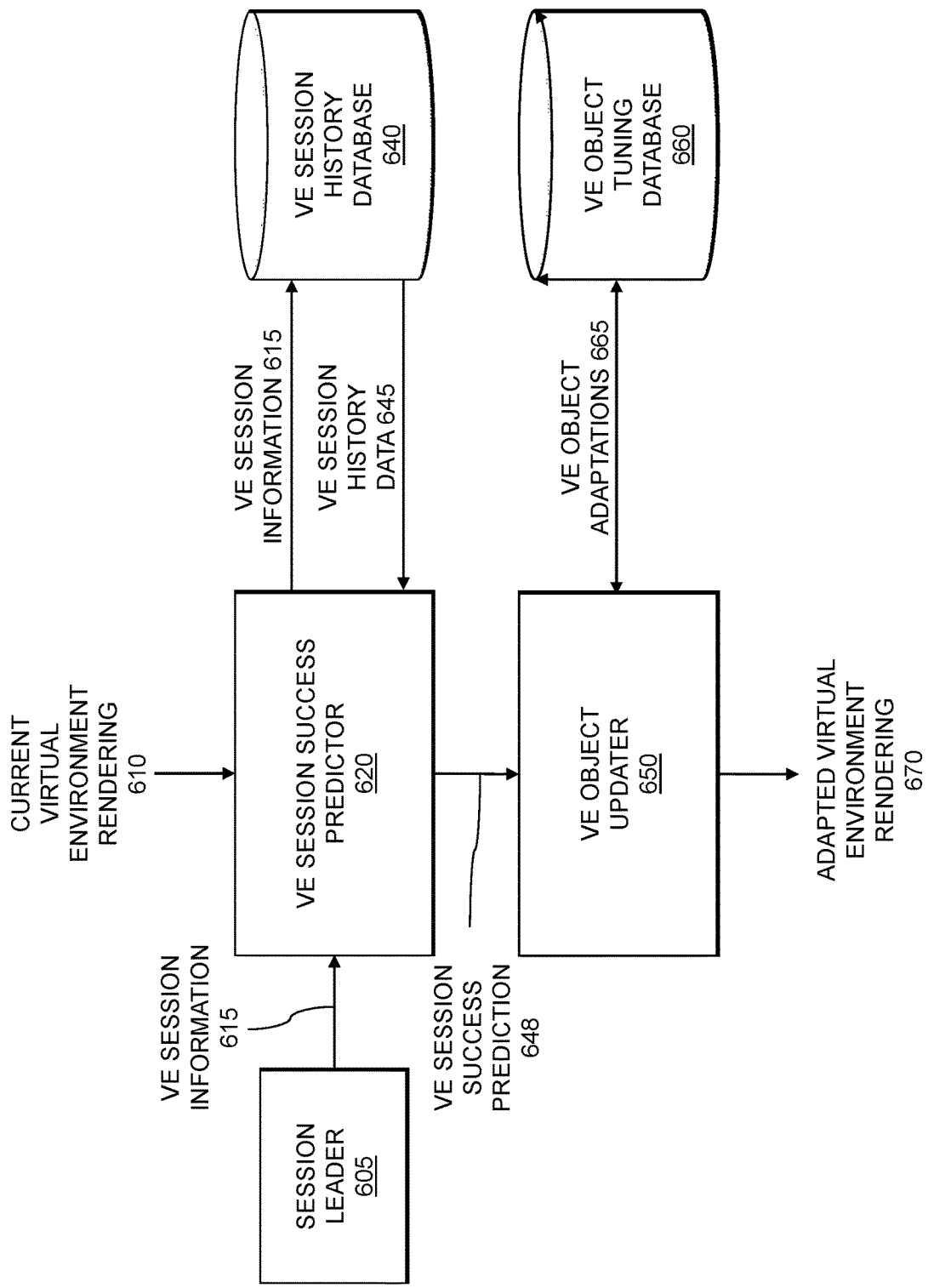

FIG. 6 illustrates an adaptation of a rendering of a current virtual environment rendering 610 based on one or more virtual environment object adaptations 665 in accordance with an illustrative embodiment. In the example of FIG. 6, a session leader 605 (or another user) provides virtual environment session information 615 characterizing various aspects of a given virtual environment session. A virtual environment session success predictor 620 is trained using data from past virtual environment sessions and processes the virtual environment session information 615 and the current virtual environment rendering 610 (e.g., a rendering of an initially recommended virtual environment). In addition, the virtual environment session success predictor 620 provides the virtual environment session information 615 to a virtual environment session history database 640. The virtual environment session history database 640 returns virtual environment session history data 645 to the virtual environment session success predictor 620 that, for example, provides data related to historical virtual environment sessions that are similar to the session characterized by the virtual environment session information 615.

The virtual environment session success predictor 620 processes the received virtual environment session history data 645 to generate a virtual environment session success prediction 648 (e.g., whether the current virtual environment session is predicted to be successful, for example, based on prior similar historical virtual environment sessions). In various embodiments, the virtual environment session success prediction 648 can be, for example, a binary value or a normalized value in the range of, e.g., 0 to 1.

The virtual environment session success prediction 648 is provided to a virtual environment object updater 650 that updates one or more virtual objects in the current virtual environment rendering 610 with new or modified virtual objects, using a virtual environment object tuning database 660, to improve the likelihood of success of the current virtual environment session using one or more virtual environment object adaptations 665. The virtual environment object updater 650 may, for example, employ optimization techniques with various tuning possibilities (such as shifting locations or other parameters of existing virtual objects, or changing colors of existing virtual objects or other portions of a virtual environment).

The virtual environment object updater 650 initiates an adapted virtual environment rendering 670 using the current virtual environment rendering 610 as modified by the virtual environment object adaptations 665.

Figure 7:
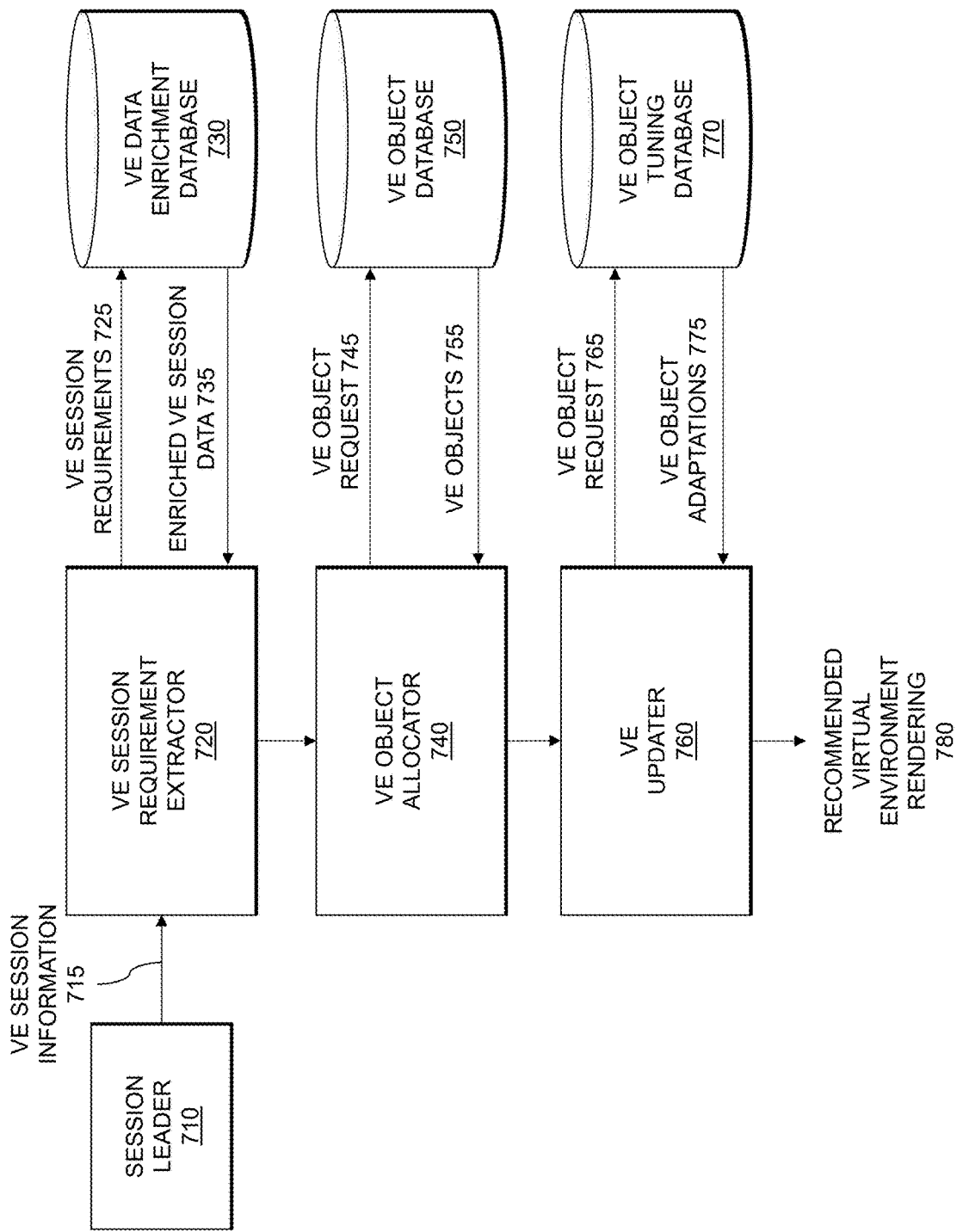

FIG. 7 illustrates a rendering of a virtual environment based on one or more virtual environment object adaptations in accordance with an illustrative embodiment. In the embodiment of FIG. 7, a session leader 710 (or another user) provides virtual environment session information 715 characterizing various aspects of a given virtual environment session. A virtual environment session requirement extractor 720 extracts one or more virtual environment session requirements 725 from the virtual environment session information 715 using, for example, predefined rules and/or natural language processing (NLP) techniques with text-based and/or voice capabilities. As used herein, the term "natural language processing" is to be broadly construed to refer to interactions between computers and human (natural) languages, where computers derive meaning from human or natural language input and respond to requests and/or commands provided by a human using natural language.

The virtual environment session requirement extractor 720 provides the extracted virtual environment session requirements 725 to a virtual environment data enrichment database 730. The virtual environment data enrichment database 730 returns enriched virtual environment session data 735 to the virtual environment session requirement extractor 720 that, for example, expands data related to one or more of the session participants and/or a topic of a particular virtual environment session, in a similar manner as discussed above in conjunction with FIG. 5.

The enriched virtual environment session data 735 is provided to a virtual environment object allocator 740 that sends virtual environment object requests 745 to a virtual environment object database 750. The virtual environment object allocator 740 may be implemented as a state machine, for example, or another deterministic algorithm where a current state will determine a next state. The virtual environment object database 750 returns one or more virtual environment objects 755 that satisfy the virtual environment object requests 745.

The virtual environment objects 755 are provided as an initial population to a virtual environment updater 760 that evolves the initial population by providing one or more virtual environment object requests 765 to a virtual environment object tuning database 770 that returns one or more virtual environment object adaptations 775 to the virtual environment updater 760 in response to the virtual environment object requests 765. One exemplary implementation of the virtual environment updater 760 is discussed further below in conjunction with FIG. 8. The virtual environment updater 760 initiates a rendering 780 of the recommended virtual environment.

FIG. 8 illustrates exemplary pseudo code for a genetic algorithm 800 for updating virtual environment objects in accordance with an illustrative embodiment. As noted above, the virtual environment updater 760 of FIG. 7 may employ the genetic algorithm 800 of FIG. 8 to perform an adaptation of initially allocated virtual environment objects. The adaptations may comprise, for example, color and/or location of virtual environment objects, for example, based on what has been successful in the past for the session participants and/or for similar virtual environment sessions. In at least some embodiments, the genetic algorithm 800 updates virtual environment objects by starting with an initial population of such virtual environment objects and evolving the initial population of virtual environment objects using, for example, crossover and/or mutation operations.

In the example of FIG. 8, the genetic algorithm 800 receives a number of indicated inputs and then initializes a population of virtual environment objects. Additional virtual environment objects are randomly added to the initialized population from a manual set of virtual environment objects to create a set, P. For those elements of the population, P, that have not been executed and evaluated, the fitness of such elements is computed using a fitness function.

New generations of the population, P, are created until the fitness threshold is exceeded, as follows. Selections of members is performed from the population, P, (e.g., of one or more of the virtual environment objects). Genetic algorithm operators (e.g., crossover and mutation) are applied to the selected virtual environment objects and the offspring are added to the population generation and one bit is modified as part of the mutation. The fitness of each element of the current population, P, is evaluated to generate a fitness score. The population, P, is updated (e.g., with any new virtual environment objects), with such updates being propagated to a library for use in further iterations.

Figure 9:
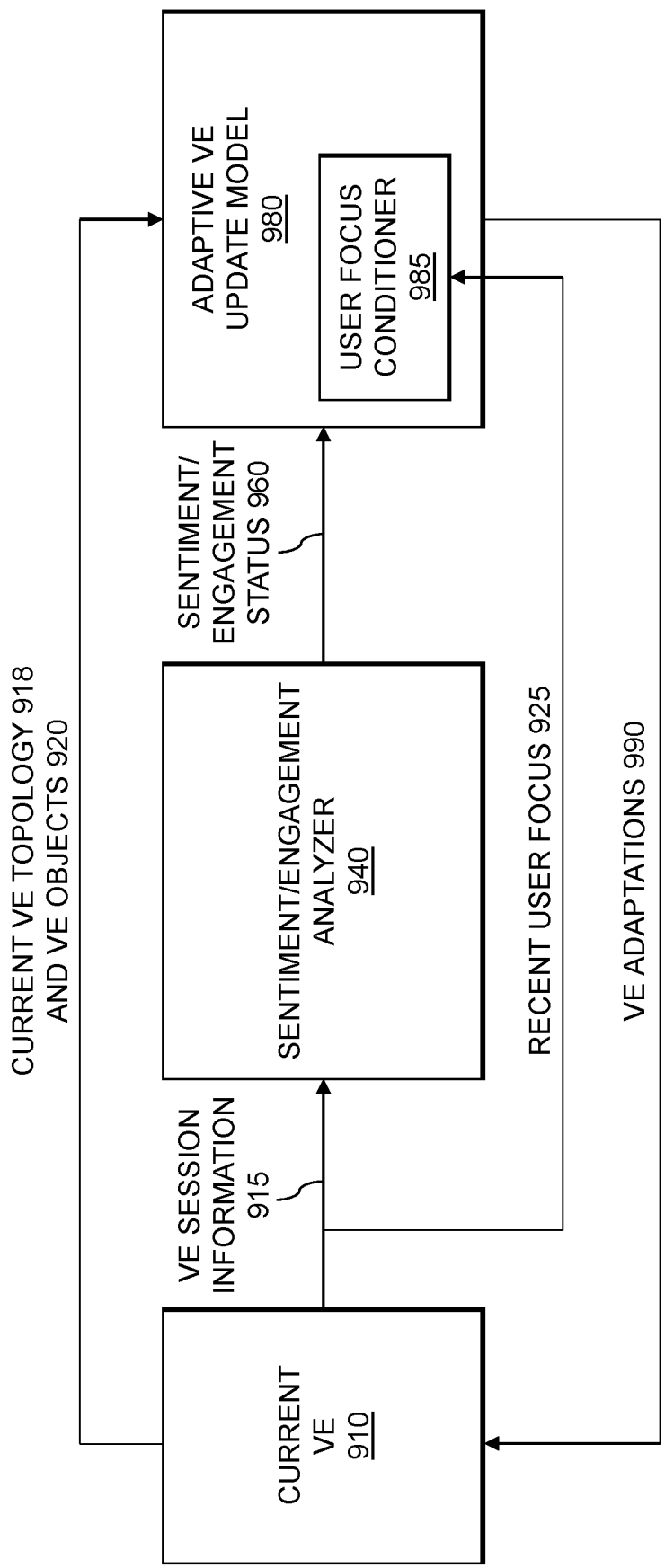
FIG. 9 illustrates an adaptation of a virtual environment based on a measured sentiment and/or engagement of one or more participants in a virtual environment session in accordance with an illustrative embodiment.

FIG. 9 illustrates an adaptation of a virtual environment based on a measured sentiment and/or engagement of one or more participants in a virtual environment session in accordance with an illustrative embodiment. Sentiment analysis is a method for determining a sentiment polarity of one or more session participants to find their attitude towards a topic or a particular virtual environment session. Based on a scoring mechanism, sentiment analysis monitors conversations and evaluates language and voice inflections to quantify attitudes, opinions, and emotions related, for example, to a session topic, such as a game, a business or a product. A deep learning algorithm-based approach may be employed in some embodiments to score the virtual environment using various inputs received from, for example, an image-based facial expression recognition model and an audio-based voice sentiment analysis model. The generated sentiment score may be employed to understand the virtual environment at a more granular level and to transform a virtual environment based on the detected sentiment (e.g., positive or negative). For example, if one or more of the session participants are determined to be stressed, the virtual environment can be transformed into a more relaxed, enjoyable, and open virtual environment where session participants can be themselves and collaborate.

Likewise, engagement level analysis is a method for determining a level of engagement of one or more session participants with a virtual environment session. For example, if one or more of the session participants are determined to be disengaged (e.g., relative to a threshold engagement score), the virtual environment can be transformed to stimulate the one or more session participants so that they can be reengaged with the content of the virtual environment session.

In the example of FIG. 9, a current virtual environment 910 is monitored and virtual environment session information 915 (e.g., conversations, body language and focus points of one or more session participants) is provided to a sentiment/engagement analyzer 940. The sentiment/engagement analyzer 940 evaluates the audio and video signals, for example, to determine a respective audio sentiment score and video sentiment score, as discussed further below in conjunction with FIG. 10. A combined sentiment/engagement module aggregates the audio sentiment/engagement score and the video sentiment/engagement score to determine an aggregate sentiment/engagement score. The sentiment/engagement analyzer 940 generates a sentiment/engagement status 960 indicating a sentiment and/or engagement level of one or more of the session participants in the current virtual environment 910.

An adaptive virtual environment update model 980 receives the sentiment/engagement status 960 from the sentiment/engagement analyzer 940, as well as a characterization of a current virtual environment topology 918 and virtual environment objects 920 that are present in the current virtual environment 910. In addition, adaptive virtual environment update model 980 receives an indication of a recent user focus 925 of one or more of the session participants.

The adaptive virtual environment update model 980 processes the received (i) sentiment/engagement status 960; (ii) current virtual environment topology 918 and virtual environment objects 920; and (iii) recent user focus 925 and generates one or more virtual environment adaptations 990 to adapt the current virtual environment 910. An exemplary implementation of the adaptive virtual environment update model 980 is discussed further below in conjunction with FIG. 11. Generally, the adaptive virtual environment update model 980 processes the current virtual environment topology 918 and the virtual environment objects 920 and learns to adapt them using one or more virtual environment adaptations 990 to improve the sentiment and/or engagement level of one or more of the session participants. For example, the one or more virtual environment adaptations 990 may comprise adaptations of the current virtual environment topology 918, virtual environment objects 920, and/or characteristics of the virtual environment objects 920 to improve the sentiment and/or engagement of the one or more session participants.

In at least some embodiments, the sentiment/engagement analyzer 940 and the adaptive virtual environment update model 980 are part of an analytics engine, such as the analytics engine 350 of FIG. 3.

In some embodiments, the one or more virtual environment adaptations 990 to adapt the current virtual environment 910 may suppress (at least temporarily) any virtual environment adaptations 990 that are within the focus of one or more of the session participants, as determined by a processing of the recent user focus 925 by a user focus conditioner 985. For example, if a given session participant is currently observing a particular virtual object in the current virtual environment 910, then any virtual environment adaptations 990 with respect to the particular virtual object may be suppressed or delayed until the recent user focus 925 shifts to a different virtual object.

In one or more embodiments, one or more session participants may each have a different view that enables aiding information to be presented to specific session participants. For example, a session leader may see a heatmap indicating the focus of one or more session participants. In other embodiments, one or more virtual environment adaptations can include user-specific topic summaries and prior conversations presented to a specific user.

Figure 10:
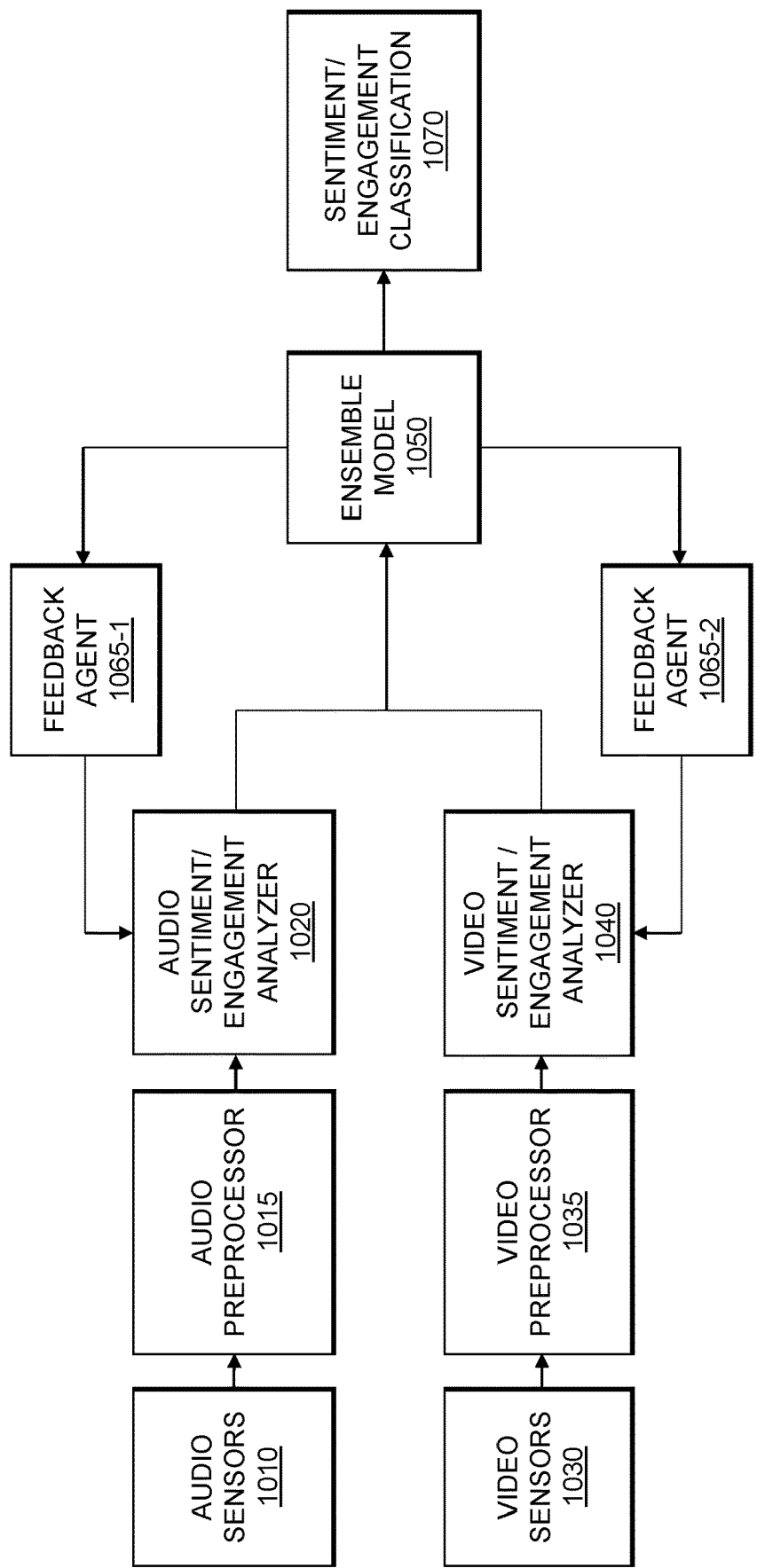
FIG. 10 illustrates an exemplary prediction of user sentiment/engagement using audio and video sentiment/engagement analyzers in accordance with an illustrative embodiment.

FIG. 10 illustrates an exemplary prediction of user sentiment/engagement using audio and video sentiment/engagement analyzers in accordance with an illustrative embodiment. In the embodiment of FIG. 10, one or more audio sensors 1010 (e.g., microphones) and one or more video sensors 1030 (e.g., cameras) are employed. The audio sensors 1010 and video sensors 1030 gather data from the current virtual environment 910 that is used for the sentiment analysis. It is noted that in some embodiments, the audio sensors 1010 and video sensors 1030 may be implemented as a single video camera that provides an audio signal and an image stream. The audio signals from the audio sensors 1010 and the video signals from the video sensors 1030 are preprocessed by respective audio preprocessor 1015 and video preprocessor 1035. In one or more embodiments, a face scanner may be employed, as well as a microphone, and/or haptic/localization sensors for other parts of the body.

An audio sentiment/engagement analyzer 1020 generates an audio sentiment/engagement score and may be implemented, for example, as a deep learning model. The model of the audio sentiment/engagement analyzer 1020 can be based on recurrent neural networks (RNNs), such as long short-term memory (LSTM) or transformers, such as Bidirectional Representation for Transformers (BERT) (following a conversion of the audio to textual information) for sentiment/engagement analysis.

A video sentiment/engagement analyzer 1040 generates a video sentiment/engagement score and may be implemented as a transformer, or deep learning model, such as a Convolutional Neural Network (CNN) for the processing of images as well as an RNN layer due to the sequential nature of the input.

In some embodiments, the machine learning models associated with the audio sentiment/engagement analyzer 1020 and/or the video sentiment/engagement analyzer 1040 may use training data based at least in part on the following training datasets: (i) CMU Multimodal Opinion Sentiment/engagement and Emotion Intensity (CMU-MOSEI) dataset for multimodal sentiment/engagement analysis and emotion recognition; and/or (ii) Interactive Emotional Dyadic Motion Capture (IEMOCAP) database comprising facial data with anchor points to aid video sentiment/engagement analysis.

The audio sentiment/engagement score and the video sentiment/engagement score generated by the audio sentiment/engagement analyzer 1020 and the video sentiment/engagement analyzer 1040, respectively, are applied to an ensemble model 1050. In some embodiments, the ensemble model 1050 is trained using the score matrices generated by the audio sentiment/engagement analyzer 1020 and the video sentiment/engagement analyzer 1040. The ensemble model 1050 generates an aggregate sentiment/engagement score according to the applied audio sentiment/engagement score and video sentiment/engagement score.

In at least some embodiments, the ensemble model 1050 comprises a deep learning model with inputs from the models of the audio sentiment/engagement analyzer 1020 and the video sentiment/engagement analyzer 1040 stacked over one another, and employs a stacking approach to determine the aggregate sentiment/engagement score. The stacking approach determines how to best combine the applied audio sentiment/engagement score prediction and video sentiment/engagement score prediction from the machine learning models of the audio sentiment/engagement analyzer 1020 and the video sentiment/engagement analyzer 1040, respectively. Among other benefits, a stacking approach can harness the capabilities of a range of well-performing models on a classification or regression task and make predictions that have better performance than any single model in the ensemble.

In some embodiments, the exemplary ensemble model 1050 employs a linear model for regression with two hyperparameters $\alpha$ and $\beta$, using the following equation:

$$\text{score} = \alpha * s_1 + \beta * s_2 + c,$$

where:
   $s_1$: score matrix from model of audio sentiment/engagement analyzer 1020,
   α: weight matrix given to $s_1$ by ensemble model 1050,
   $s_2$: Score Matrix from Model of Video Sentiment/Engagement Analyzer 1040,
   β: weight matrix given to $s_2$ by ensemble model 1050, and
   c: constant.

It is noted that for a classification task, a consensus mechanism may be employed.

In the example of FIG. 10, the aggregate sentiment/engagement score according to the applied audio sentiment/engagement score and video sentiment/engagement score generated by the ensemble model 1050 is used to determine a sentiment/engagement classification 1070, which is also applied to feedback agents 1065-1 and 1065-2. The feedback agents 1065-1 and 1065-2 process the sentiment/engagement classification 1070, and optionally user feedback ratings indicating whether the generated sentiment/engagement classification 1070 is accurate, to update and/or retrain the respective models of the audio sentiment/engagement analyzer 1020 and/or the video sentiment/engagement analyzer 1040. In this manner, the accuracy of the audio sentiment/engagement analyzer 1020 and/or the video sentiment/engagement analyzer 1040 can be improved over time. The sentiment/engagement classification 1070 may comprise, for example, one or more sentiment classes (e.g., anxious, positive, neutral and negative) and/or one or more engagement classes (e.g., engaged or disengaged). In other embodiments, the sentiment/engagement classification 1070 may comprise, for example, a sentiment score (e.g., indicating a degree of positivity or negativity) and/or an engagement score (e.g., indicating a degree of engagement or disengagement).

In the embodiment shown in FIG. 10, the audio sentiment/engagement analyzer 1020 and/or the video sentiment/engagement analyzer 1040 are illustrated as being distinct from one another. In addition, the audio sentiment/engagement analyzer 1020 and/or the video sentiment/engagement analyzer 1040 in the example of FIG. 10 each comprise distinct models relative to one another. In other embodiments, the audio sentiment/engagement analyzer 1020 and the video sentiment/engagement analyzer 1040 may employ a shared machine learning model, or one or more portions of a given machine learning model may be shared by the audio sentiment/engagement analyzer 1020 and the video sentiment/engagement analyzer 1040.

In one or more embodiments, the sentiment/engagement classification 1070 may be processed to select one or more automated remedial actions to perform to adapt the virtual environment (for example, in accordance with a predefined policy) in order to improve the virtual environment for one or more session participants, when suggested by the sentiment/engagement classification 1070. For example, remedial action may be appropriate when there has been a sudden drop in the sentiment/engagement score that suggests that there is tension in the virtual environment and one or more session participants are feeling uneasy or that one or more of the session participants are not fully engaged.

In at least one exemplary implementation, the following virtual environment adaptations may be performed in response to the determined sentiment/engagement classification 1070:
   adjusting the lighting of the virtual environment to a softer and less intense light (which may have a positive impact on the session participants, causing them to relax and feel less stressed);
   adjusting a music source to play slow and stress-free music in the virtual environment which can help session participants relax during a long virtual environment session (for example, when a decrease in the final sentiment/engagement score indicates that session participants are getting distracted and/or are tense);
   reducing one or more virtual objects in the virtual environment session;
   replacing one or more virtual objects in the virtual environment session;
   repositioning one or more virtual objects in the virtual environment session to improve the engagement with respect to the repositioned virtual objects;
   adapting one or more virtual objects (e.g., color and/or location of the objects) in the current virtual environment session; and
   generating one or more real-time alerts using virtual environment adaptations to notify the appropriate individuals (e.g., one or more session participants) if there has been a sudden change in the sentiment/engagement score to help such individuals determine the root cause for the drop in the sentiment/engagement score.

In some embodiments, it may be a goal to start a virtual environment session with a baseline level of sentiment/engagement and increase the sentiment/engagement over the course of a virtual environment session (e.g., to stir emotion to ultimately achieve the goals of the session).

Figure 11:
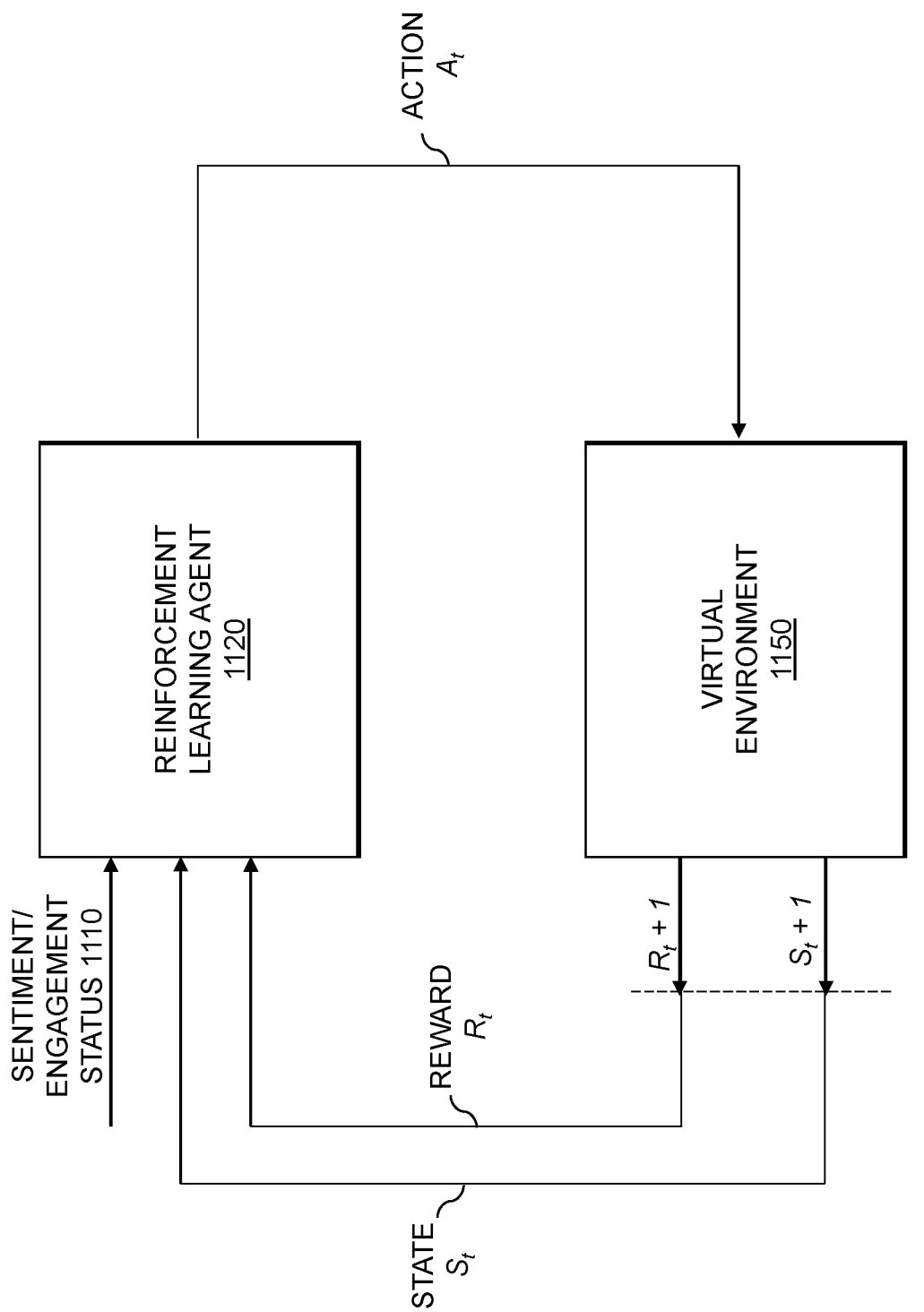
FIG. 11 illustrates an exemplary implementation of the adaptive virtual environment update model of FIG. 9 in further detail in accordance with an illustrative embodiment.

FIG. 11 illustrates an exemplary implementation of the adaptive virtual environment update model 980 of FIG. 9 in further detail in accordance with an illustrative embodiment. As noted above, the adaptive virtual environment update model 980 processes the current virtual environment topology 918 and the virtual environment objects 920 and learns to adapt them using one or more virtual environment adaptations 990 to improve the sentiment and/or engagement level of one or more of the session participants.

In the example of FIG. 11, a reinforcement learning framework is shown, which includes a reinforcement learning agent 1120 and a virtual environment 1150. Such a reinforcement learning framework is illustratively configured to learn in a trial-and-error manner which virtual environment adaptations have the greatest impact on performance measured in terms of specific performance parameters, described below. The reinforcement learning framework illustratively generates recommended virtual environment adaptation actions for the virtual environment, and continually updates its learning over time, thereby achieving further improvements of the performance of the virtual environment.

As shown in FIG. 11, the reinforcement learning agent 1120 receives a sentiment/engagement status 1110 of one or more session participants and receives or observes a state $S_t$ at a time t. The sentiment/engagement status 1110 becomes part of the state $S_t$. The reinforcement learning agent 1120 selects an action $A_t$ based on an action selection policy, and transitions to a next state $S_{t+1}$ at a time t+1. The reinforcement learning agent 1120 receives a reward $R_{t+1}$ at a time t+1. The reinforcement learning agent 1120 leverages a reinforcement learning algorithm, which may include but is not limited to a Q-learning algorithm, a Deep Q-Networks (DQN) algorithm, a Double DQN (DDQN) algorithm, etc., to update an action-value function $Q(S_i, A_i)$.

In one or more embodiments, the selected action $A_t$ involves a virtual environment adaptation that involves modifying one or more state parameters of the current virtual environment topology 918 and/or the virtual environment objects 920 (such as the lighting of the virtual environment and the color and/or size of one or more virtual objects). In addition, in some embodiments, the selected action $A_t$ may involve suggesting one or more topics or phrasing to employ for various detected sentiments and/or engagement levels. For example, sentiment-based sentence examples are discussed below in conjunction with FIG. 13.

An example Q-learning algorithm comprises a value-based reinforcement learning algorithm configured to determine an optimal action-selection policy using a Q function. DQN approximates a state-value function in a Q-learning framework with a neural network. As an extension of Q-learning, DON utilizes a replay buffer and a target network, both of which help improve algorithm stability. DDQN is an improvement for DQN. In DQN, the target Q-network selects and evaluates every action, potentially resulting in an overestimation of Q value. To resolve this issue, DDQN uses the Q-network to choose the action and uses the target Q-network to evaluate the action. Again, these are just examples, and other types of reinforcement learning algorithms can be used.

The action-value function defines a long-term value of taking an action $A_t$ in a state $S_t$, as will be described in further detail below. Over time, the reinforcement learning agent 1120 learns to pursue actions that lead to the greatest cumulative reward at any state. For example, a positive sentiment and/or a high engagement level may correlate with a positive reward.

Techniques for defining states, actions and rewards will now be described. A state space S includes a set of possible state values. A state $S_t \in S$ is a vector of values from $S=\{S_1, S_2, \ldots, S_n\}$ at time step t. In this example, the state $S_t$ illustratively represents virtual environment information (denoted virtual_environment_infot), sentiment performance information (denoted sentiment_perf_infot) and virtual environment object combinations (denoted VE_object_combination_infot) at time step t. More particularly, $S_t$ is illustratively given by the following:

{virtual_environment_infot, sentiment_perf_infot, VE_object_combination_infot}

It is to be appreciated, however, that different configurations of $S_t$ can be used in other embodiments. The action space will now be described. The reinforcement learning agent 1120, as noted above, observes the current state $S_t$ at each time step t and takes an action $A_t$. In some embodiments, the action $A_t$ involves modifying one or more aspects of the current virtual environment topology 918 and/or the virtual environment objects 920, in the form of virtual environment adaptations.

An exemplary reward function R is defined in at least some embodiments to guide the reinforcement learning agent 1120 towards a good solution for a given objective. For example, the objective for the agent in some embodiments is to achieve the best possible sentiment and/or engagement performance. The reward $R_{t+1}$ may thus be defined using various key performance indicators (KPIs) for the virtual environment, such as sentiment; engagement; successful outcome of the session; and negative sentiment for competitors.

$$R_{t+1} = W_1 * \left( \frac{KPI_{1, average} + KPI_{1, initial}}{KPI_{1, initial}} \right) + W_2 * \left( \frac{KPI_{2, average} - KPI_{2, initial}}{KPI_{2, initial}} \right) +$$
$$W_3 * \left( \frac{KPI_{3, average} + KPI_{3, initial}}{KPI_{3, initial}} \right) + W_4 \left( \frac{KPI_{4, average} + KPI_{4, initial}}{KPI_{4, initial}} \right)$$

where $W_1$ through $W_4$ denote weights applied to the respective KPI parameters. Such weights can be adjusted depending upon the relative importance of each KPI within a given virtual environment implementation and are each illustratively set to 0.25 to represent an equal importance of these example parameters. Also, additional or alternative KPIs or other parameters can be used to define the reward function in other embodiments. Again, these are example reward functions, and other types and configurations of reward functions can be used in other embodiments.

One or more aspects of the disclosure recognize that a successful virtual environment session often depends in large part on the interactions of the session participants and/or a customization of the virtual environment session. Session participants must often engage with many different people. This often makes it difficult for a given session participant to keep track of the history and preferences of other session participants and to share valuable information between a team of session participants that are assigned for a particular different session participant. To address this issue, at least embodiments of the disclosure use different NLP techniques to identify and extract relevant information from previous interactions. In this manner, the entire team has access to a full picture of the particular different session participant, such as his or her preferences, and emphasizes aspects that should be focused/addressed when discussing a particular topic for a new virtual environment session. This can enhance the virtual environment experience and/or shorten the time to completion of a given virtual environment session.

In at least some embodiments, the session participants in historical virtual environment sessions are separated into different categories of speakers to separately capture, for example, what was said by one or more session participants and by a session leader. Conversation topics can be identified, such as topics of products, technical aspects and competitors, to create summaries of each topic. In addition, the disclosed sentiment/engagement analysis techniques can be employed to analyze the sentiment of responses of session participants and suggest topics or phrasing to use and topics that should be avoided.

Figure 12:
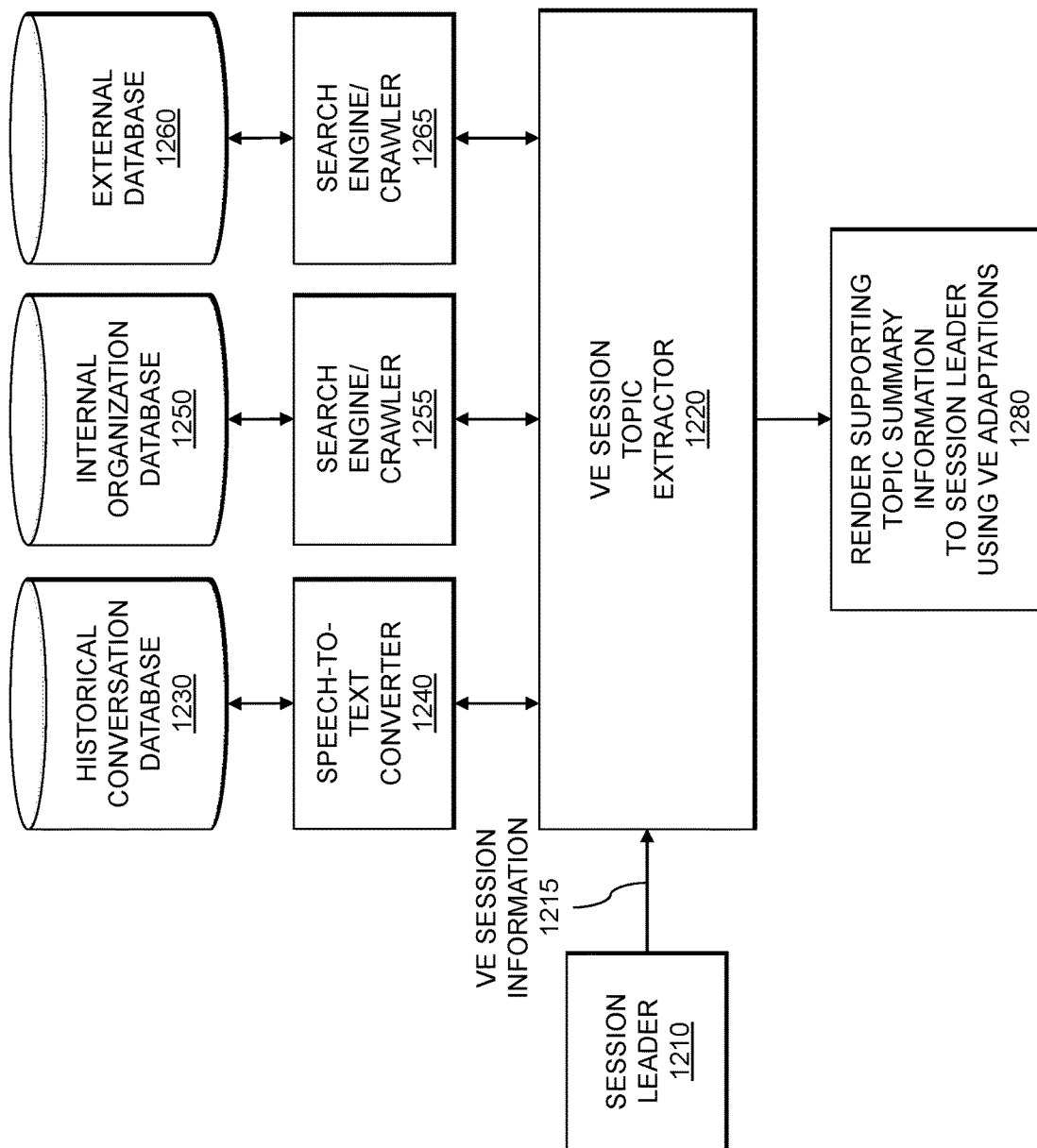
FIG. 12 illustrates a generation and rendering of topic summaries for presentation during a virtual environment session in accordance with an illustrative embodiment.

FIG. 12 illustrates a generation and rendering of topic summaries for presentation during a virtual environment session in accordance with an illustrative embodiment. In the example of FIG. 12, a session leader 1210 (or another session participant) provides virtual environment session information 1215 characterizing various aspects of a current virtual environment session to a virtual environment session topic extractor 1220 that extracts one or more virtual environment session topics from the virtual environment session information 1215 using, for example, predefined rules and/or NLP techniques with text-based and/or voice capabilities.

The virtual environment session topic extractor 1220 processes historical conversations from a historical conversation database 1230, where the historical conversations have been converted to text using a speech-to-text converter 1240. The virtual environment session topic extractor 1220 extracts conversation topics from the converted historical virtual environment conversations, such as products, online games, technical aspects and competitors. The topics can be identified, for example, by highlighting relevant sentences in a given conversation by choosing: (i) the textual information before and after a mention of a topic entity; and/or (ii) the sentence or paragraph containing the entity.

In addition, the virtual environment session topic extractor 1220 leverages a first search engine/crawler 1255 to extract additional topics from an internal organization database 1250. For example, the topics extracted from the internal organization database 1250 may comprise product-related topics. The virtual environment session topic extractor 1220 may apply question/answering methods to extract relevant information about a topic of a current virtual environment session as indicated in the virtual environment session information 1215.

The virtual environment session topic extractor 1220 may also leverage a second search engine/crawler 1265 to extract additional topics from an external database 1260 (e.g., the internet or another public database). The virtual environment session topic extractor 1220 may again apply question/answering methods to extract relevant information about a topic of the current virtual environment session as indicated in the virtual environment session information 1215. For example, the topics extracted from the external organization database 1260 may comprise topics related to competitors in order to highlight differences with respect to objects being presented in a given virtual environment session.

The virtual environment session topic extractor 1220 processes the session topics from the virtual environment session information 1215 to obtain supporting topic information from topics extracted from one or more of the historical conversation database 1230, the internal organization database 1250 and the external organization database 1260.

The virtual environment session topic extractor 1220 provides the identified supporting topic information to one or more of the session participants by initiating a rendering of the identified supporting topic information to the one or more session participants, such as a session leader, using one or more virtual environment adaptations 1280. As noted above, one or more session participants (e.g., the session leader 1210) may each have a different view that enables aiding information to be presented to the specific session participants. For example, the one or more virtual environment adaptations can include user-specific topic summaries and prior conversations presented to a specific session participant. In this manner, the session leader or another session participant can have a clear view of past conversations that could be leveraged in the current virtual environment session.

Figure 13:
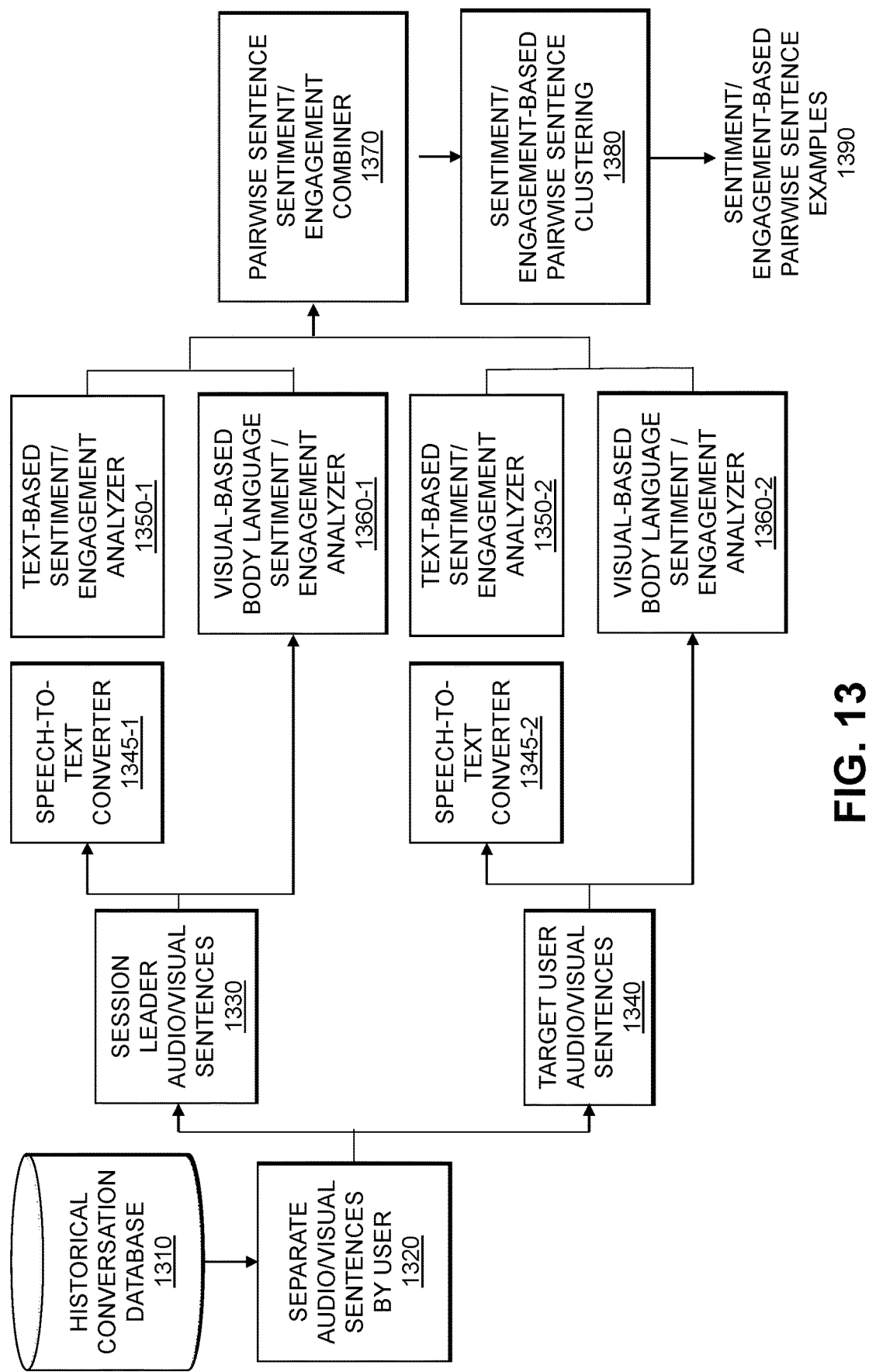
FIG. 13 illustrates an exemplary prediction of user sentiment and generation of sentiment-based sentence examples using clustering techniques in accordance with an illustrative embodiment.

FIG. 13 illustrates an exemplary prediction of user sentiment and generation of sentiment-based sentence examples using clustering techniques in accordance with an illustrative embodiment. In the embodiment of FIG. 13, audio/visual-based sentences in historical conversations from a historical conversation database 1310 are separated by user (e.g., by each different session participants) at stage 1320. For example, the historical conversations can be separated into session leader audio/visual sentences 1330 and target user audio/visual sentences 1340. Target users may comprise session participants other than one or more designated session leaders.

As shown in FIG. 13, the session leader audio/visual sentences 1330 are converted to text using a speech-to-text converter 1345-1 and then processed by a text-based sentiment/engagement analyzer 1350-1. In addition, the target user audio/visual sentences 1340 are applied to a visual-based body language sentiment/engagement analyzer 1360-1.

In addition, the target user audio/visual sentences 1340 are converted to text using a speech-to-text converter 1345-2 and then processed by a text-based sentiment/engagement analyzer 1350-2. In addition, the target user audio/visual sentences 1340 are applied to a visual-based body language sentiment/engagement analyzer 1360-2.

The text-based sentiment/engagement analyzers 1350-1 and 1350-2 may be implemented in a similar manner as the sentiment/engagement analyzer 940 of FIG. 9 to determine the text-based sentiment/engagement score (or class) of a given target user based on the text extracted from the historical conversations of the given target user (for example, using a bag of words approach and/or word embedding techniques). The visual-based body language sentiment/engagement analyzers 1360-1 and 1360-2 may be implemented in a similar manner as the sentiment/engagement analyzer 940 of FIG. 9 to determine the visual-based sentiment/engagement score (or class) of a given target user based on the body language of the given target user during the historical conversations of the given target user.

The text-based sentiment/engagement scores (or classes) and the body language sentiment/engagement scores (or classes) generated by the text-based sentiment/engagement analyzers 1350-1 and 1350-2 and the visual-based body language sentiment/engagement analyzers 1360-1 and 1360-2, respectively, for each pairwise session leader audio/visual sentence 1330 and corresponding target user audio/visual sentence 1340, are applied to a pairwise sentence sentiment/engagement combiner 1370. In some embodiments, the pairwise sentence sentiment/engagement combiner 1370 analyzes the pairwise session leader and target user sentences and generates an aggregate sentiment/engagement score according to the applied text-based sentiment/engagement score and body language sentiment/engagement score. As previously noted, the predicted sentiment classes may include anxious, positive, neutral and/or negative. The predicted engagement classes may include engaged or disengaged.

The aggregate sentiment/engagement score is used to perform sentiment/engagement-based pairwise sentence clustering 1380 to provide sentiment/engagement-based sentence examples 1390. The sentiment/engagement-based pairwise sentence clustering 1380 is performed in some embodiments on each group of sentences (e.g., positive, negative and neutral sentences), for example, using k-means and/or hierarchical clustering techniques to find clusters of similar phrases. Thus, the sentiment/engagement-based sentence examples 1390 comprise example sentences for various types of sentiment and/or engagement.

One or more embodiments of the present disclosure recognize that presenting a given session participant with user-specific information about one or more other session participants in the form of virtual environment adaptations provides an opportunity for the given session participant to increase trust with the one or more other session participants by leveraging such user-specific information.

In some embodiments, technical information is distinguished from personal information and technical and personal information can be separately summarized. Such information can be presented to a given session participant in the form of virtual environment adaptations to better inform the given session participant and prepare the given session participant for a given virtual environment session. In this manner, from a technical perspective, technical information from prior conversations can be summarized to provide efficient progress. Likewise, personal information from prior conversations can be summarized to allow the given session participant that receives such summarized personal information to follow up on personal aspects previously raised by another session participant.

Figure 14:
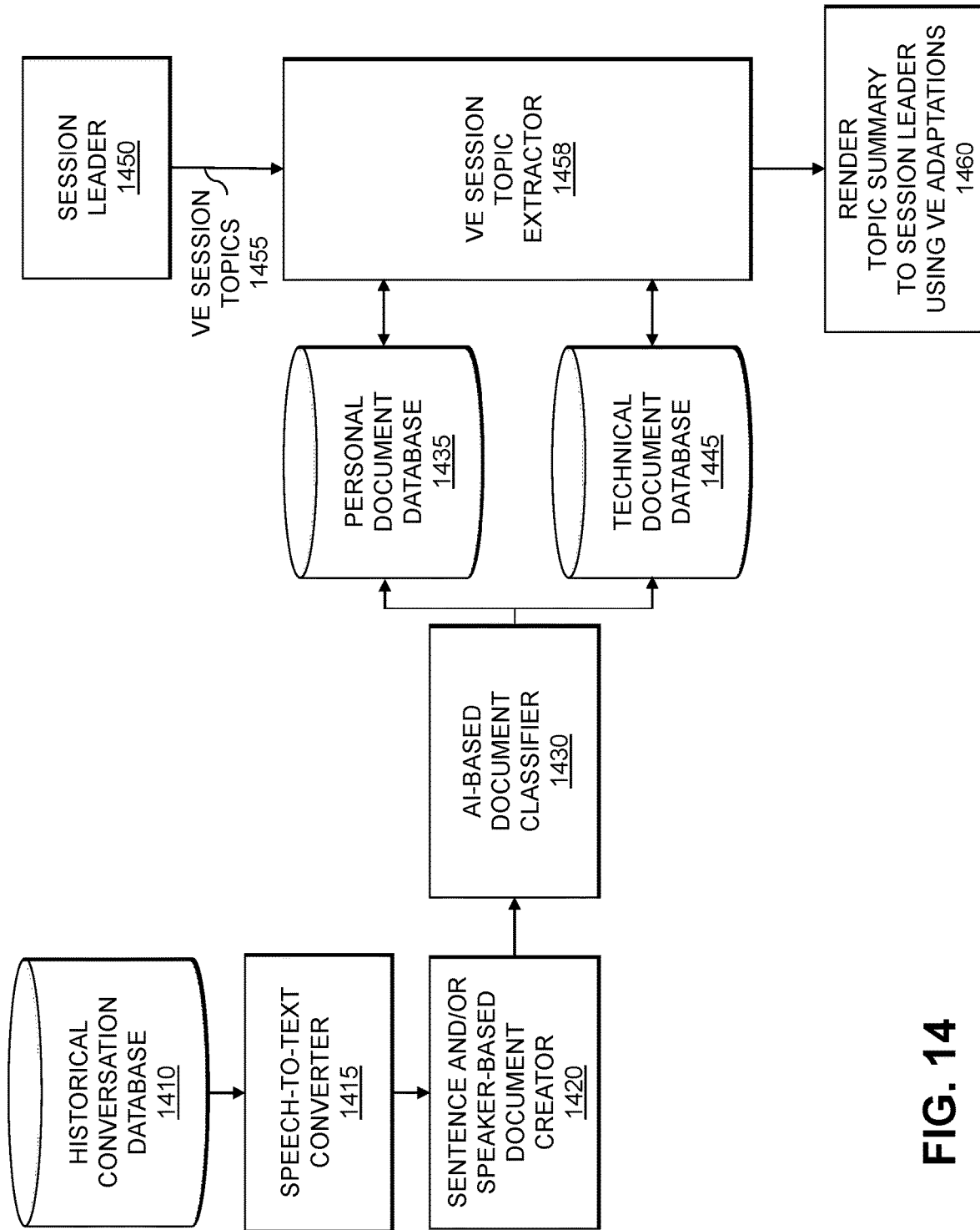
FIG. 14 illustrates a generation and rendering of topic summaries for presentation during a virtual environment session in accordance with an illustrative embodiment.

FIG. 14 illustrates a generation and rendering of topic summaries for presentation during a virtual environment session in accordance with an illustrative embodiment. In the example of FIG. 14, historical conversations from a historical conversation database 1410 may be converted to text documents using a speech-to-text converter 1415. In some embodiments, the sentiment can be analyzed directly from the speech signals (a video/audio representation of past sessions may be saved, for example, for training new hires). The documents can be processed to represent different topics of conversations, such as topics based on sentences and speaker-specific topics based on a speaker identification. Thus, sentence-based documents and/or speaker-based documents are created from the historical conversations by a document creator 1420.

An artificial intelligence-based document classifier 1430 is applied to the sentence-based documents and/or speaker-based documents to classify each document as a personal document or a technical document, for storage in a personal document database 1435 or a technical document database 1445, respectively.

A session leader 1450 (or another session participant) provides virtual environment session topics 1455 characterizing various anticipated topics of a current virtual environment session to a virtual environment session topic extractor 1458 that extracts one or more virtual environment session topics 1455 from the virtual environment session topics 1455 using, for example, predefined rules and/or NLP techniques with text-based and/or voice capabilities.

The extracted virtual environment session topics, in some embodiments, have a classification of being technical or personal information. Such classification can be used to further tailor the information that is presented to one or more session participants in the form of virtual environment adaptations. For example, the extracted personal information may be personal information that was shared between a given session leader and particular session participant. Thus, such extracted personal information should not be shared with other session participants, beyond the given session leader and particular session participant. Likewise, the technical information may be applicable to a team of session participants, and thus may be beneficial to share such technical information among the team of session participants.

The virtual environment session topic extractor 1458 provides the extracted topic summary information to one or more of the session participants by initiating a rendering of the identified supporting topic summary information to the one or more session participants, such as a session leader, using one or more virtual environment adaptations 1460. As noted above, one or more session participants (e.g., the session leader 1450) may each have a different view that enables aiding information to be presented to the specific session participants. For example, the one or more virtual environment adaptations can include user-specific personal topic summaries and user-specific technical topic summaries presented to a specific session participant. In this manner, the session leader or another session participant can have a clear view of previously exchanged technical and personal information that could be leveraged in the current virtual environment session.

Figure 15:
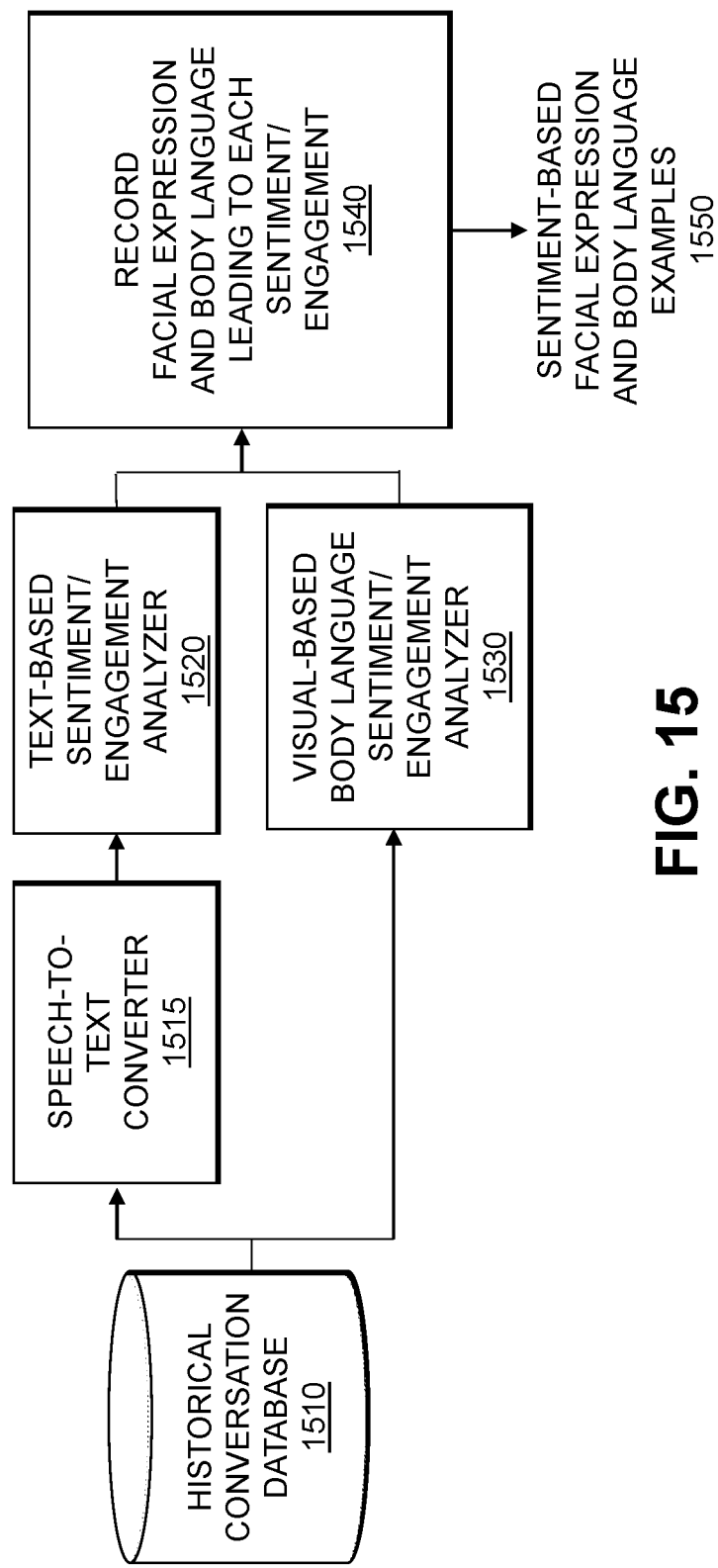
FIG. 15 illustrates an exemplary training process for learning sentiment-based facial expression and body language examples in accordance with an illustrative embodiment.

FIG. 15 illustrates an exemplary training process for learning sentiment-based facial expression and body language examples in accordance with an illustrative embodiment. In the example of FIG. 15, historical conversations from a historical conversation database 1510 are converted to text using a speech-to-text converter 1515 and the text-based sentences in the historical conversations are then applied to a text-based sentiment/engagement analyzer 1520. In addition, visual-based sentences in the historical conversations are applied to a visual-based body language sentiment/engagement analyzer 1530. The text-based sentiment/engagement analyzer 1520 may be implemented in a similar manner as the sentiment/engagement analyzer 1350 of FIG. 13 to determine the sentiment/engagement of a given target user based on the text extracted from the historical conversations of the given target user (for example, using a bag of words approach and/or word embedding techniques). The visual-based body language sentiment/engagement analyzer 1530 may be implemented in a similar manner as the visual-based sentiment/engagement analyzers 1360 of FIG. 13 to determine the sentiment/engagement of a given target user based on the body language of the given target user during the historical conversations of the given target user.

The facial expression and body language leading to each sentiment/engagement is then recorded at stage 1540, to provide a collection of sentiment-based facial expression and body language examples 1550. The collection of sentiment-based facial expression and body language examples 1550 learned using the techniques of FIG. 15 are then leveraged in a manner described further below in conjunction with FIG. 16.

Generally, the collection of sentiment-based facial expression and body language examples 1550 aim to capture behaviors of a particular session participant, such as the session leader, that led to a positive sentiment and/or engagement for another session participant (such as a target user). The learning may be performed for general target users and session leaders, for example, and may be fine-tuned for specific target users (e.g., customers) and specific session leaders (or target user-session leader pairs).

Figure 16:
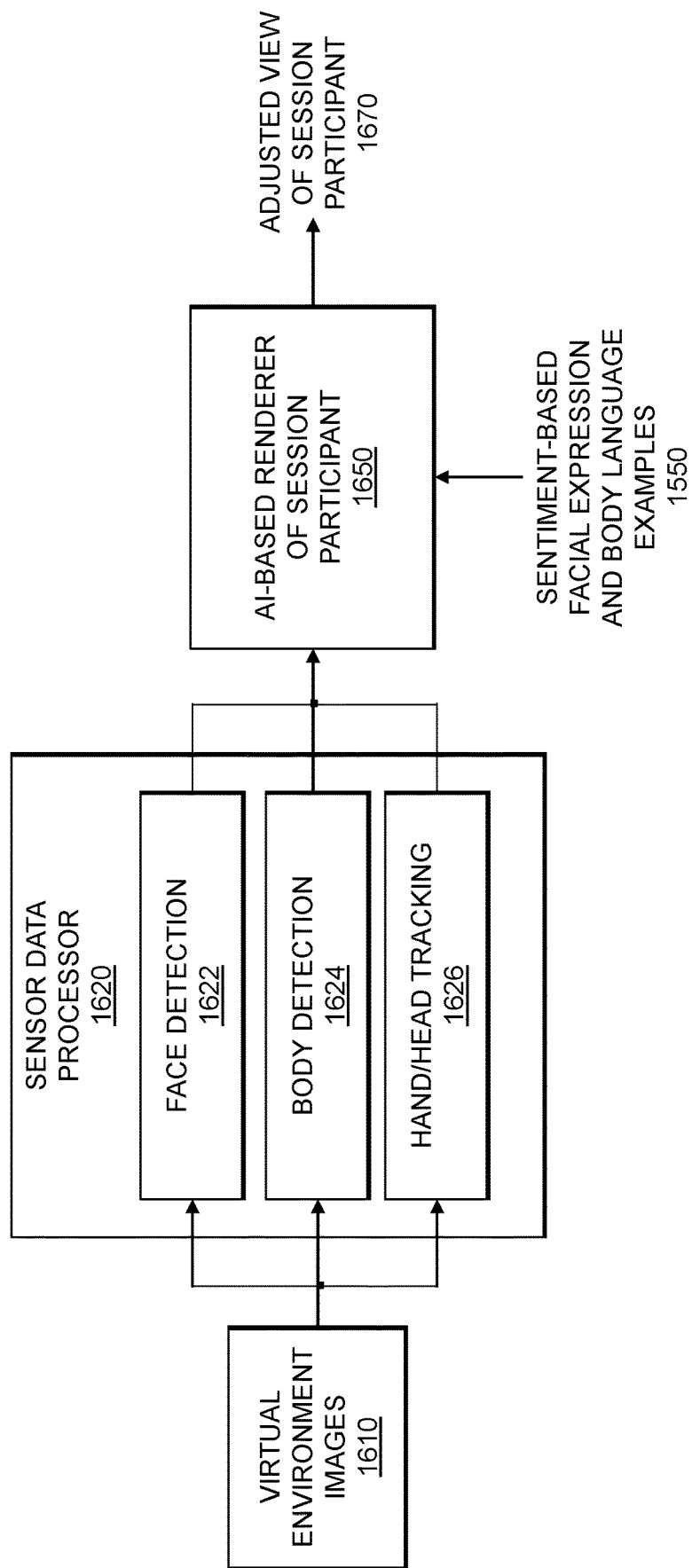
FIG. 16 illustrates a generation and rendering of a session participant in a virtual environment using artificial intelligence and the sentiment-based examples of FIG. 15 in accordance with an illustrative embodiment.

FIG. 16 illustrates a generation and rendering of a session participant, such as a session leader, in a virtual environment using artificial intelligence and the sentiment-based examples of FIG. 15 in accordance with an illustrative embodiment. In the example of FIG. 16, one or more virtual environment images 1610 obtained from the virtual environment in the vicinity of a remote user are applied to the sensor data processor 1620. The exemplary sensor data processor 1620 comprises a face detection module 1622, a body detection module 1624 and a hand/head tracking module 1626. In one or more embodiments, the face detection module 1622 may be used to detect the face of the remote user (e.g., the session leader or an avatar of the session leader) in the obtained images, the body detection module 1624 may be used to detect the body (and/or body position) of the remote user in the obtained images (or an avatar or another virtual representation of the remote user), and the hand/head tracking module 1626 may be used to track the position and/or movement of the hand and/or head of the remote user.

It is to be appreciated that this particular arrangement of modules 1622, 1624, 1626 illustrated in the sensor data processor 1620 of the FIG. 16 embodiment is presented by way of example only, and alternative arrangements can be used in other embodiments. For example, the functionality associated with modules 1622, 1624, 1626 in other embodiments can be combined into a single module or separated across a larger number of modules. As another example, multiple distinct processors and/or memory elements can be used to implement different ones of modules 1622, 1624, 1626 or portions thereof. At least portions of modules 1622, 1624, 1626 may be implemented at least in part in the form of software that is stored in memory and executed by a processor.

The sensor data processor 1620 may further include one or more additional modules and other components typically found in conventional implementations of such devices, although such additional modules and other components are omitted from the figure for clarity and simplicity of illustration.

The signals generated by the face detection module 1622, the body detection module 1624 and the hand/head tracking module 1626 are applied to an AI-based renderer of session participant 1650, along with the sentiment-based facial expression and body language examples 1550 learned using the techniques of FIG. 15. For additional details regarding techniques employed by the AI-based renderer of session participant 1650, see, for example, Ruben Tolosana et al., Deepfakes and Beyond: A Survey of Face Manipulation and Fake Detection, Information Fusion, Vol. 64, 131-148 (2020), incorporated by reference herein.

In one or more embodiments, the AI-based renderer of session participant 1650 may employ deep fake techniques or other AI-based techniques for generating virtual representations of individuals in a computing environment. The AI-based renderer of session participant 1650 analyzes the applied input signals representing the detected face, body, hand and head characteristics of a specific session participant (such as a session leader) to generate an adjusted view of the session participant 1670. The AI-based renderer of session participant 1650 may modify the facial expression and/or body language of a specific session participant, such as the session leader, using the sentiment-based facial expression and body language examples 1550, to achieve a desired sentiment (e. g., a positive sentiment) in another session participant (such as a target user). The adjusted view of the session participant 1670 may be achieved, for example, using one or more virtual environment adaptations, in the manner previously described.

Figure 17:
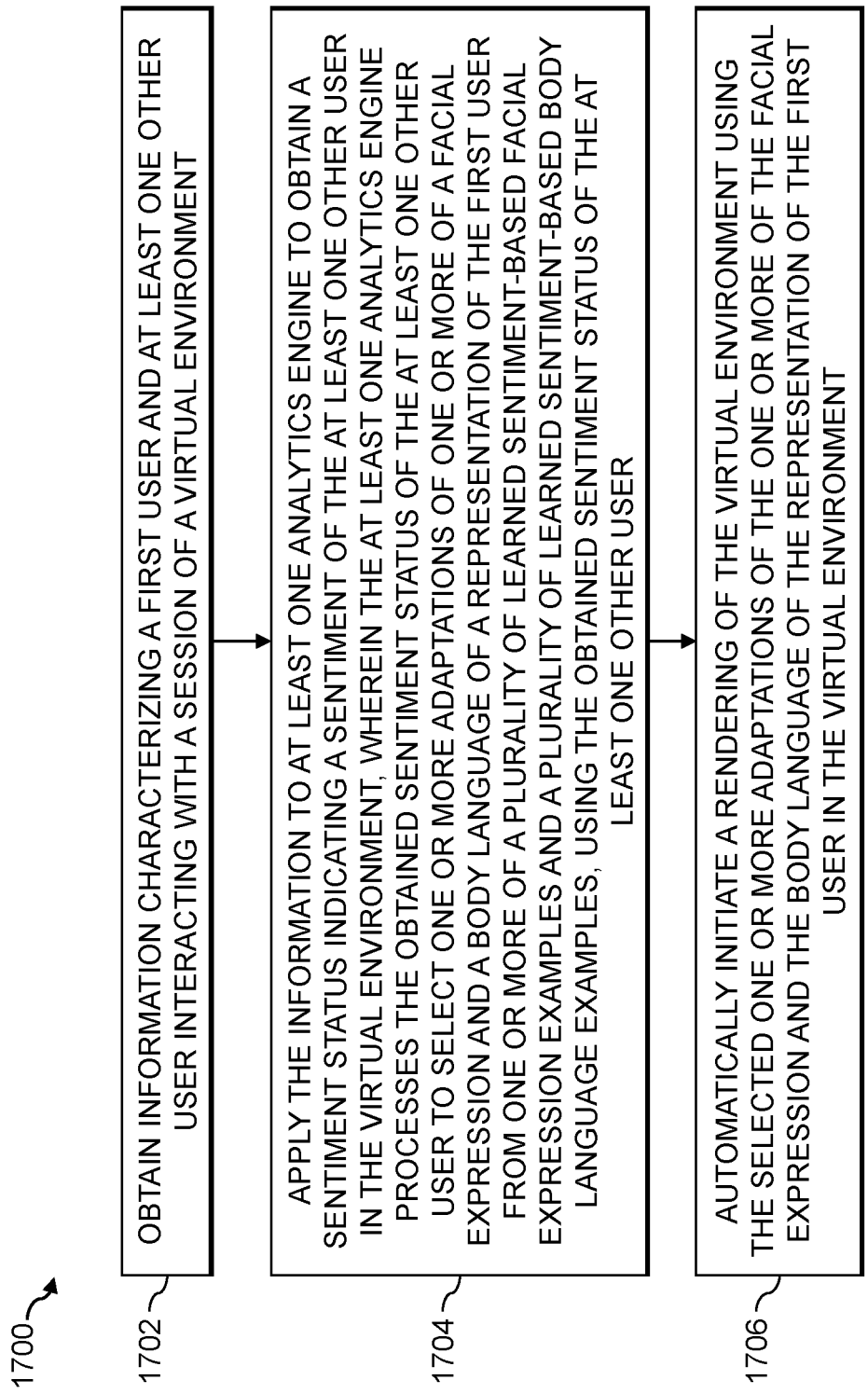
FIG. 17 is a flow diagram illustrating an exemplary implementation of a process for sentiment-based adaptations of facial expression and body language virtual environments in accordance with an illustrative embodiment.

FIG. 17 is a flow diagram illustrating an exemplary implementation of a process 1700 for sentiment-based adaptations of facial expression and body language virtual environments in accordance with an illustrative embodiment. In the example of FIG. 17, information is obtained in step 1702 characterizing a first user and at least one other user interacting with a session of a virtual environment. The information is applied in step 1704 to at least one analytics engine to obtain a sentiment status indicating a sentiment of the at least one other user in the virtual environment, wherein the at least one analytics engine processes the obtained sentiment status of the at least one other user to select one or more adaptations of one or more of a facial expression and a body language of a representation of the first user from one or more of a plurality of learned sentiment-based facial expression examples and a plurality of learned sentiment-based body language examples, using the obtained sentiment status of the at least one other user.

In step 1706, the process 1700 automatically initiates a rendering of the virtual environment using the selected one or more adaptations of the one or more of the facial expression and the body language of the representation of the first user in the virtual environment.

In some embodiments, the one or more of the plurality of learned sentiment-based facial expression examples and the plurality of learned sentiment-based body language examples are learned during a training phase. The training phase may comprise learning one or more of a facial expression and a body language behavior of the first user that led to one or more of a particular sentiment status and a particular engagement status for another user.

In at least one embodiment, the at least one analytics engine applies one or more artificial intelligence techniques to the obtained sentiment status of the first user to perform the selection. The at least one analytics engine may employ at least one artificial intelligence-based technique for generating virtual representations of individuals to generate the one or more adaptations of the one or more of the facial expression and the body language of the representation of the first user in the virtual environment.

In one or more embodiments, the sentiment status is obtained using a text-based sentiment analysis and/or a body language-based sentiment analysis. The one or more of the plurality of learned sentiment-based facial expression examples and the plurality of learned sentiment-based body language examples comprise one or more of a facial expression and a body language leading to a particular sentiment status of the at least one other user.

Figure 18:
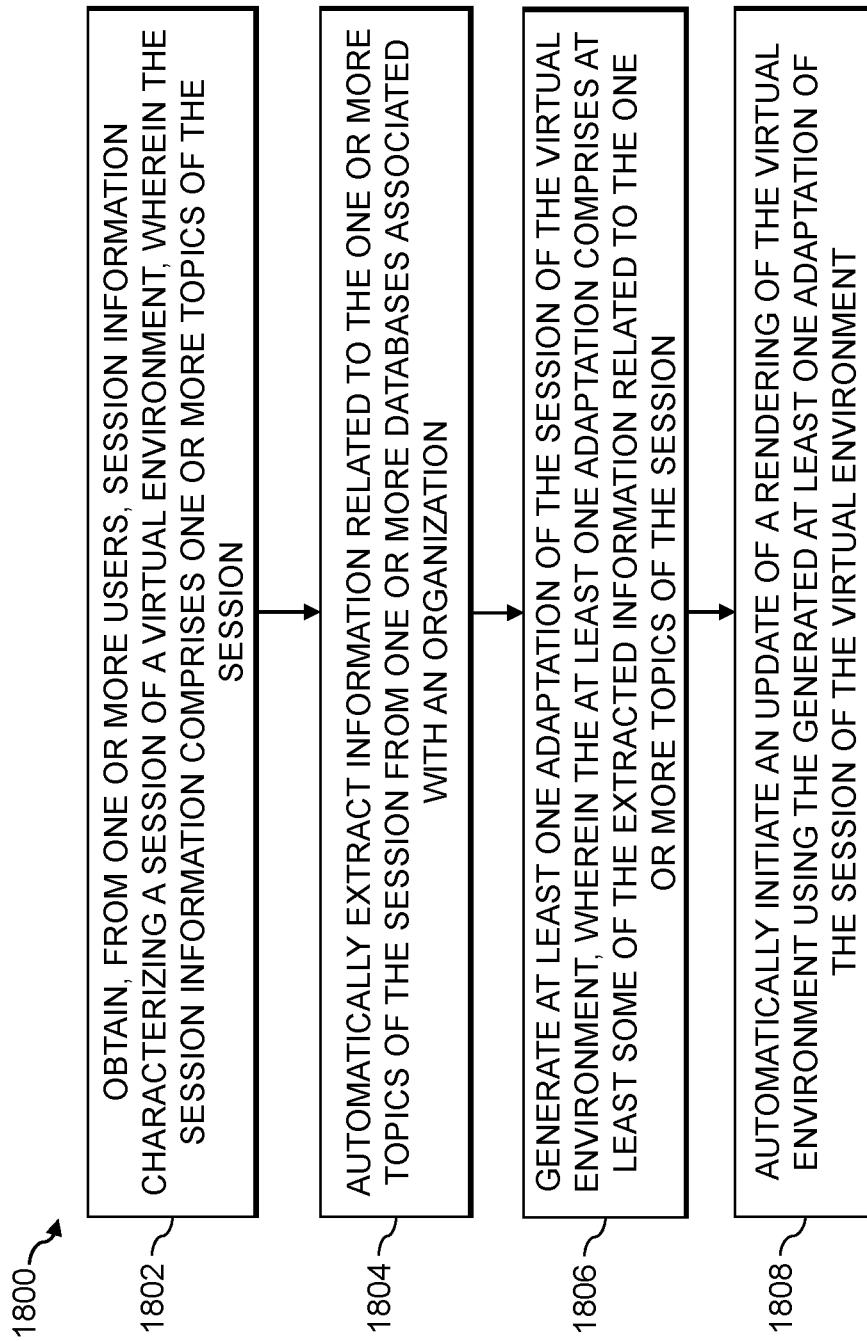
FIG. 18 is a flow diagram illustrating an exemplary implementation of a process for presentation of topic information using adaptations of a virtual environment in accordance with an illustrative embodiment.

FIG. 18 is a flow diagram illustrating an exemplary implementation of a process 1800 for presentation of topic information using adaptations of a virtual environment in accordance with an illustrative embodiment. In the example of FIG. 18, session information is obtained in step 1802, from one or more users, characterizing a session of a virtual environment, wherein the session information comprises one or more topics of the session. In step 1804 information related to the one or more topics of the session is automatically extracted from one or more databases associated with an organization.

In step 1806, the process 1800 generates at least one adaptation of the session of the virtual environment, wherein the at least one adaptation comprises at least some of the extracted information related to the one or more topics of the session. An update of a rendering of the virtual environment is automatically initiated in step 1808 using the generated at least one adaptation of the session of the virtual environment.

In some embodiments, the one or more databases associated with the organization comprise a database of historical conversations in one or more virtual environments and wherein the automatically extracting comprises converting at least some of the historical conversations to text to obtain corresponding textual representations of the at least some of the historical conversations. A document classifier employing one or more artificial intelligence techniques may be applied to the textual representations of the at least some of the historical conversations to classify the textual representations of the at least some of the historical conversations as comprising one of technical content and personal content. The rendering of the virtual environment using at least some of the extracted information may employ a first treatment of the extracted information that is classified as technical content and a second treatment of the extracted information that is classified as personal content. The second treatment of the extracted information that is classified as personal content may comprise only presenting personal content, to one or more given users, of a plurality of users, that is based on historical conversations where the one or more given users were a participant.

In one or more embodiments, user-specific information may be presented to one or more users using at least one adaptation of the virtual environment. The rendering of the virtual environment using the generated at least one adaptation of the session of the virtual environment may be provided only to a given user of a plurality of users. The automatically extracting information related to the one or more topics may employ one or more of rules and natural language processing techniques. The rendering of the virtual environment using the generated at least one adaptation of the session of the virtual environment may be provided only to a given user of a plurality of users.

Figure 19:
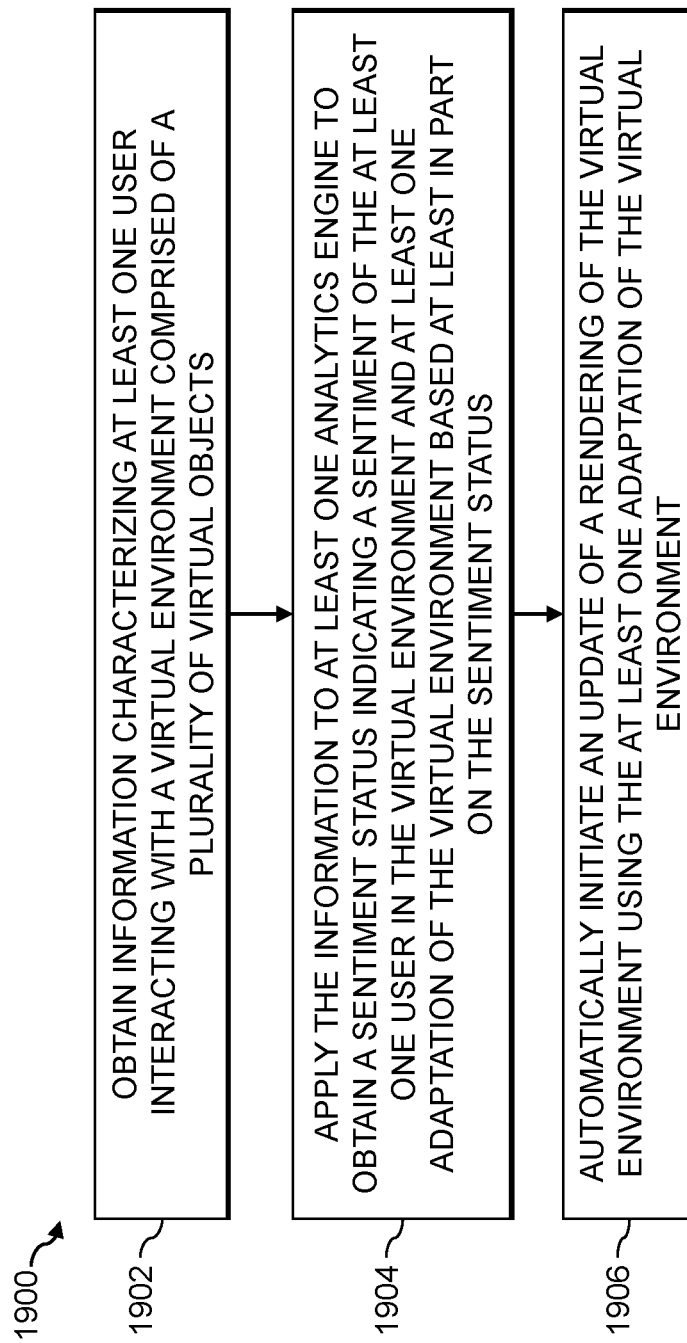
FIG. 19 is a flow diagram illustrating an exemplary implementation of a process for sentiment-based adaptations of virtual environments in accordance with an illustrative embodiment.

FIG. 19 is a flow diagram illustrating an exemplary implementation of a process 1900 for sentiment-based adaptations of virtual environments in accordance with an illustrative embodiment. In the example of FIG. 19, information is obtained in step 1902 characterizing at least one user interacting with a virtual environment comprised of a plurality of virtual objects. In step 1904, the process 1900 applies the information to at least one analytics engine to obtain a sentiment status indicating a sentiment of the at least one user in the virtual environment and at least one adaptation of the virtual environment based at least in part on the sentiment status. In step 1906, the process 1900 automatically initiates an update of a rendering of the virtual environment using the at least one adaptation of the virtual environment.

In at least one embodiment, the information characterizing the at least one user comprises one or more of sensor data associated with the at least one user interacting with the virtual environment and information characterizing an avatar representation of the at least one user interacting with the virtual environment. The sentiment status may comprise an anxious status, a positive status, a negative status and/or a neutral status. The engagement level of the at least one user may be obtained and at least one adaptation of the virtual environment may be determined based at least in part on the engagement level.

In some embodiments, the at least one analytics engine comprises at least one ensemble model that determines the sentiment status indicating the sentiment of the at least one user in the virtual environment, wherein the at least one ensemble model determines the sentiment status by processing an audio-based sentiment score and a video-based sentiment score indicating the sentiment of the at least one user in the virtual environment.

In one or more embodiments, the at least one analytics engine comprises at least one reinforcement learning agent that determines the at least one adaptation of the virtual environment based at least in part on the sentiment status using a plurality of states of the virtual environment and a reward. The at least one reinforcement learning agent may traverse the plurality of states and may be trained to select a particular action for a given state, wherein the particular action comprises a given virtual environment adaptation that modifies one or more parameters of the virtual environment. The at least one adaptation of the virtual environment may comprise presenting, to one or more of the at least one user, a sentiment-based phrase selected from a plurality of sentiment-based phrases in the virtual environment. An application of a given one of the at least one adaptation of the virtual environment may be one or more of suppressed and delayed in response to the given adaptation impacting an area of focus in the virtual environment of one or more of the at least one user.

In at least one embodiment, the virtual environment may be generated by obtaining, from one or more users, session information characterizing one or more requirements of a session of a virtual environment; extracting the one or more requirements of the virtual environment from the session information; generating an initial population comprising a plurality of general virtual objects for placement in the virtual environment that satisfy the one or more requirements of the session of the virtual environment; applying the plurality of virtual objects to a virtual environment updating module that employs an evolutionary algorithm to evolve the initial population by replacing one or more of the plurality of allocated general virtual objects with one or more corresponding replacement virtual objects based at least in part on additional information associated with the session; and automatically initiating a rendering of the virtual environment using the one or more corresponding replacement virtual objects. The virtual environment updating module may employ a genetic algorithm to evolve the initial population.

The particular processing operations and other network functionality described in conjunction with the flow diagrams of FIGS. 17 through 19, for example, are presented by way of illustrative example only, and should not be construed as limiting the scope of the disclosure in any way. Alternative embodiments can use other types of processing operations for adapting a virtual environment. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for adapting a virtual environment. The foregoing applications and associated embodiments should be considered as illustrative only, and numerous other embodiments can be configured using the techniques disclosed herein, in a wide variety of different applications.

It should also be understood that the disclosed techniques for adapting a virtual environment, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adapting a virtual environment may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based virtual environment adaptation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 20 and 21. These platforms may also be used to implement at least portions of other information processing systems in other embodiments.

Figure 20:
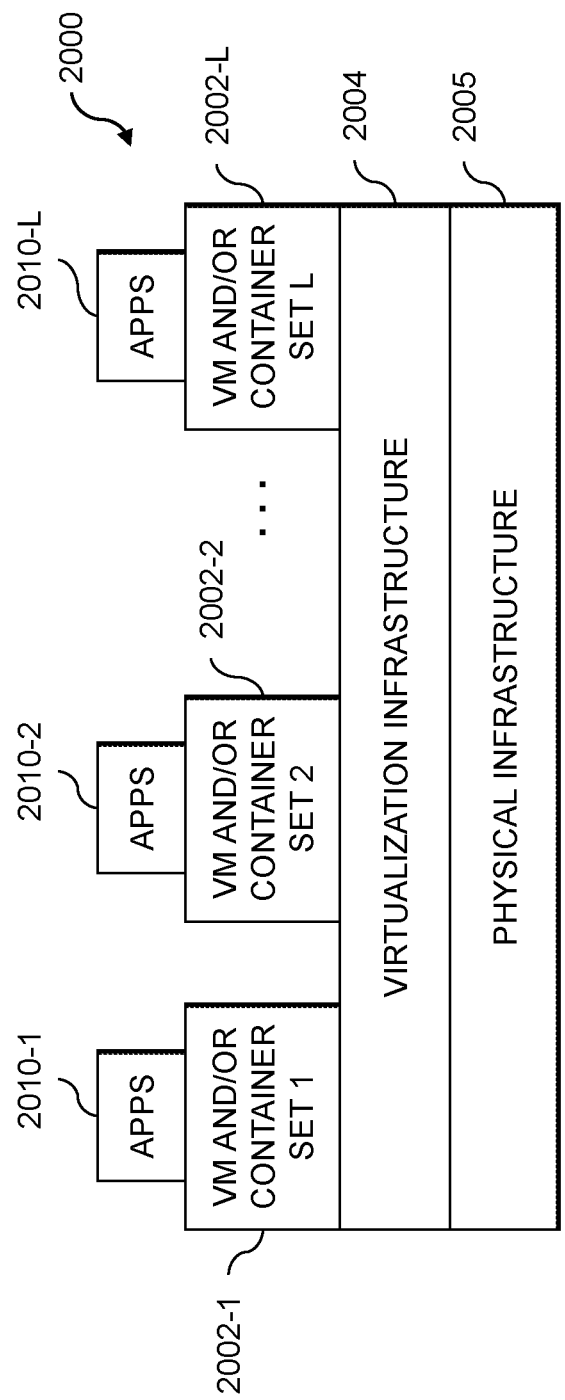
FIG. 20 illustrates an exemplary processing platform that may be used to implement at least a portion of one or more embodiments of the disclosure comprising a cloud infrastructure.

FIG. 20 shows an example processing platform comprising cloud infrastructure 2000. The cloud infrastructure 2000 comprises a combination of physical and virtual processing resources that may be utilized to implement at least a portion of the information processing system 100. The cloud infrastructure 2000 comprises multiple virtual machines (VMs) and/or container sets 2002-1, 2002-2, . . . 2002-L implemented using virtualization infrastructure 2004. The virtualization infrastructure 2004 runs on physical infrastructure 2005, and illustratively comprises one or more hypervisors and/or operating system level virtualization infrastructure. The operating system level virtualization infrastructure illustratively comprises kernel control groups of a Linux operating system or other type of operating system.

The cloud infrastructure 2000 further comprises sets of applications 2010-1, 2010-2, 2010-L running on respective ones of the VMs/container sets 2002-1, 2002-2, . . . 2002-L under the control of the virtualization infrastructure 2004. The VMs/container sets 2002 may comprise respective VMs, respective sets of one or more containers, or respective sets of one or more containers running in VMs.

In some implementations of the FIG. 20 embodiment, the VMs/container sets 2002 comprise respective VMs implemented using virtualization infrastructure 2004 that comprises at least one hypervisor. Such implementations can provide virtual environment adaptation functionality of the type described above for one or more processes running on a given one of the VMs. For example, each of the VMs can implement virtual environment adaptation control logic and associated functionality for monitoring users in a virtual environment, for one or more processes running on that particular VM.

An example of a hypervisor platform that may be used to implement a hypervisor within the virtualization infrastructure 2004 is the VMware® vSphere® which may have an associated virtual infrastructure management system such as the VMware® vCenter™. The underlying physical machines may comprise one or more distributed processing platforms that include one or more storage systems.

In other implementations of the FIG. 20 embodiment, the VMs/container sets 2002 comprise respective containers implemented using virtualization infrastructure 2004 that provides operating system level virtualization functionality, such as support for Docker containers running on bare metal hosts, or Docker containers running on VMs. The containers are illustratively implemented using respective kernel control groups of the operating system. Such implementations can provide virtual environment adaptation functionality of the type described above for one or more processes running on different ones of the containers. For example, a container host device supporting multiple containers of one or more container sets can implement one or more instances of virtual environment adaptation control logic and associated functionality for monitoring users in a virtual environment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2000 shown in FIG. 20 may represent at least a portion of one processing platform. Another example of such a processing platform is processing platform 2100 shown in FIG. 21.

The processing platform 2100 in this embodiment comprises at least a portion of the given system and includes a plurality of processing devices, denoted 2102-1, 2102-2, 2102-3, . . . 2102-K, which communicate with one another over a network 2104. The network 2104 may comprise any type of network, such as a WAN, a LAN, a satellite network, a telephone or cable network, a cellular network, a wireless network such as WiFi or WiMAX, or various portions or combinations of these and other types of networks.

The processing device 2102-1 in the processing platform 2100 comprises a processor 2110 coupled to a memory 2112. The processor 2110 may comprise a microprocessor, a microcontroller, an ASIC, an FPGA or other type of processing circuitry, as well as portions or combinations of such circuitry elements, and the memory 2112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2102-1 is network interface circuitry 2114, which is used to interface the processing device with the network 2104 and other system components, and may comprise conventional transceivers.

The other processing devices 2102 of the processing platform 2100 are assumed to be configured in a manner similar to that shown for processing device 2102-1 in the figure.

Again, the particular processing platform 2100 shown in the figure is presented by way of example only, and the given system may include additional or alternative processing platforms, as well as numerous distinct processing platforms in any combination, with each such platform comprising one or more computers, storage devices or other processing devices.

Figure 21:
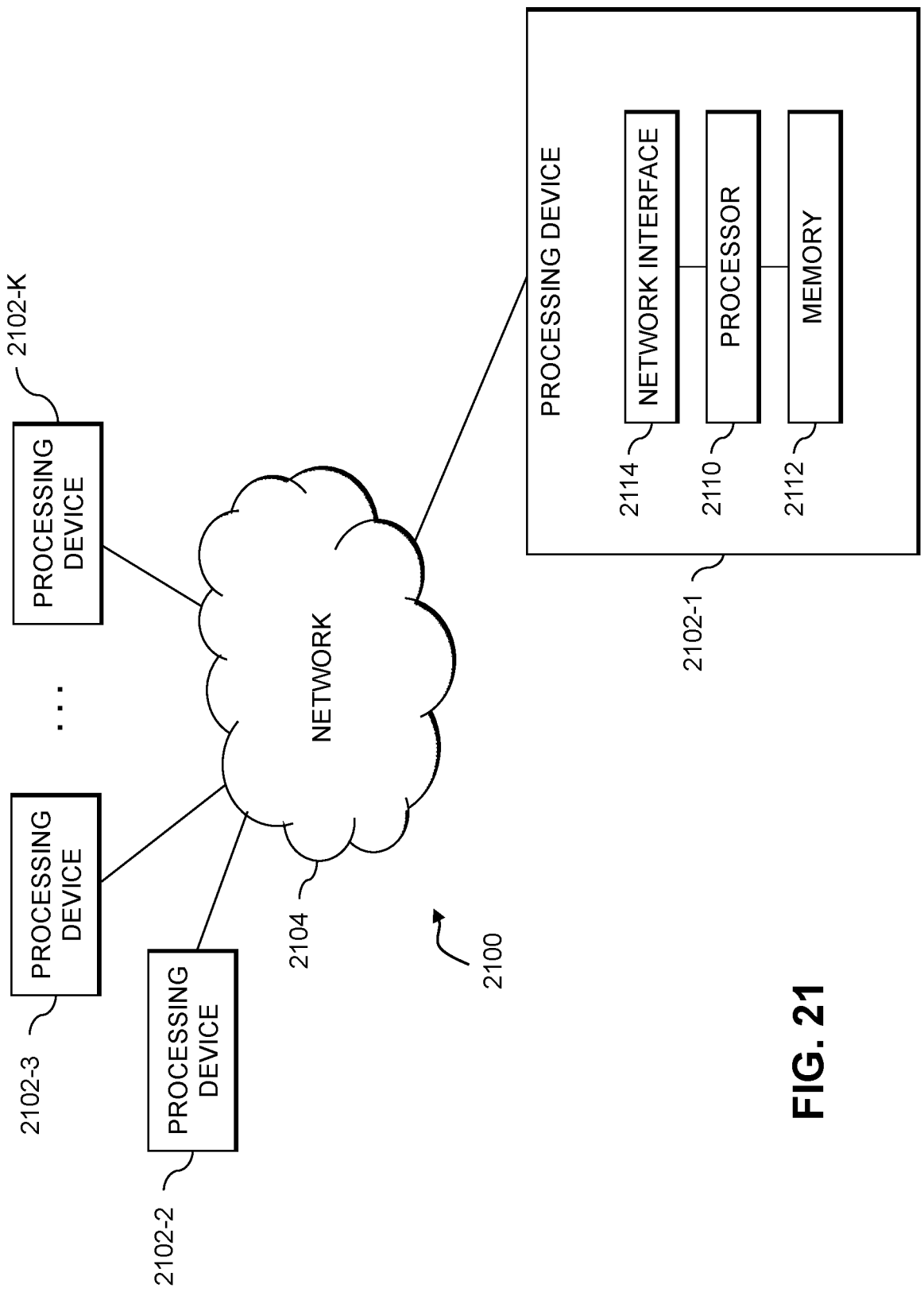
FIG. 21 illustrates another exemplary processing platform that may be used to implement at least a portion of one or more embodiments of the disclosure.

Multiple elements of an information processing system may be collectively implemented on a common processing platform of the type shown in FIG. 20 or 21, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, from one or more users, session information characterizing a session of a virtual environment, wherein the session information comprises one or more topics of the session;
automatically extracting, responsive to the obtaining the session information characterizing the session of the virtual environment from the one or more users, information, related to the one or more topics of the session, from one or more databases associated with an organization;
generating at least one adaptation of the session of the virtual environment, wherein the at least one adaptation comprises at least some of the extracted information related to the one or more topics of the session; and
automatically initiating an update of a rendering of the virtual environment using the generated at least one adaptation of the session of the virtual environment;
wherein the method is performed by at least one processing device comprising a processor coupled to a memory.

2. The method of claim 1, wherein the one or more databases associated with the organization comprise a database of historical conversations in one or more virtual environments and wherein the automatically extracting comprises converting at least some of the historical conversations to text to obtain corresponding textual representations of the at least some of the historical conversations.

3. The method of claim 2, further comprising applying a document classifier employing one or more artificial intelligence techniques to the textual representations of the at least some of the historical conversations to classify the textual representations of the at least some of the historical conversations as comprising one of technical content and personal content.

4. The method of claim 3, wherein the rendering of the virtual environment using at least some of the extracted information employs a first treatment of the extracted information that is classified as technical content and a second treatment of the extracted information that is classified as personal content.

5. The method of claim 4, wherein the second treatment of the extracted information that is classified as personal content comprises only presenting personal content, to one or more given users of a plurality of users, that is based on historical conversations where the one or more given users were a participant.

6. The method of claim 1, further comprising presenting user-specific information to one or more users using at least one adaptation of the virtual environment.

7. The method of claim 1, wherein the automatically extracting information related to the one or more topics employs one or more of extraction rules and natural language processing techniques.

8. The method of claim 1, wherein the rendering of the virtual environment using the generated at least one adaptation of the session of the virtual environment is provided only to a given user of a plurality of users.

9. An apparatus comprising:
at least one processing device comprising a processor coupled to a memory;
the at least one processing device being configured to implement the following steps:
obtaining, from one or more users, session information characterizing a session of a virtual environment, wherein the session information comprises one or more topics of the session;
automatically extracting, responsive to the obtaining the session information characterizing the session of the virtual environment from the one or more users, information, related to the one or more topics of the session, from one or more databases associated with an organization;

generating at least one adaptation of the session of the virtual environment, wherein the at least one adaptation comprises at least some of the extracted information related to the one or more topics of the session; and automatically initiating an update of a rendering of the virtual environment using the generated at least one adaptation of the session of the virtual environment.

10. The apparatus of claim 9, wherein the one or more databases associated with the organization comprise a database of historical conversations in one or more virtual environments and wherein the automatically extracting comprises converting at least some of the historical conversations to text to obtain corresponding textual representations of the at least some of the historical conversations and further comprising applying a document classifier employing one or more artificial intelligence techniques to the textual representations of the at least some of the historical conversations to classify the textual representations of the at least some of the historical conversations as comprising one of technical content and personal content.

11. The apparatus of claim 10, wherein the rendering of the virtual environment using at least some of the extracted information employs a first treatment of the extracted information that is classified as technical content and a second treatment of the extracted information that is classified as personal content, and wherein the second treatment of the extracted information that is classified as personal content comprises only presenting personal content, to one or more given users of a plurality of users, that is based on historical conversations where the one or more given users were a participant.

12. The apparatus of claim 9, further comprising presenting user-specific information to one or more users using at least one adaptation of the virtual environment.

13. The apparatus of claim 9, wherein the automatically extracting information related to the one or more topics employs one or more of extraction rules and natural language processing techniques.

14. The apparatus of claim 9, wherein the rendering of the virtual environment using the generated at least one adaptation of the session of the virtual environment is provided only to a given user of a plurality of users.

15. A non-transitory processor-readable storage medium having stored therein program code of one or more software programs, wherein the program code when executed by at least one processing device causes the at least one processing device to perform the following steps:

obtaining, from one or more users, session information characterizing a session of a virtual environment, wherein the session information comprises one or more topics of the session;

automatically extracting, responsive to the obtaining the session information characterizing the session of the virtual environment from the one or more users, information, related to the one or more topics of the session, from one or more databases associated with an organization;

generating at least one adaptation of the session of the virtual environment, wherein the at least one adaptation comprises at least some of the extracted information related to the one or more topics of the session; and automatically initiating an update of a rendering of the virtual environment using the generated at least one adaptation of the session of the virtual environment.

16. The non-transitory processor-readable storage medium of claim 15, wherein the one or more databases associated with the organization comprise a database of historical conversations in one or more virtual environments and wherein the automatically extracting comprises converting at least some of the historical conversations to text to obtain corresponding textual representations of the at least some of the historical conversations and further comprising applying a document classifier employing one or more artificial intelligence techniques to the textual representations of the at least some of the historical conversations to classify the textual representations of the at least some of the historical conversations as comprising one of technical content and personal content.

17. The non-transitory processor-readable storage medium of claim 16, wherein the rendering of the virtual environment using at least some of the extracted information employs a first treatment of the extracted information that is classified as technical content and a second treatment of the extracted information that is classified as personal content, and wherein the second treatment of the extracted information that is classified as personal content comprises only presenting personal content, to one or more given users of a plurality of users, that is based on historical conversations where the one or more given users were a participant.

18. The non-transitory processor-readable storage medium of claim 15, further comprising presenting user-specific information to one or more users using at least one adaptation of the virtual environment.

19. The non-transitory processor-readable storage medium of claim 15, wherein the automatically extracting information related to the one or more topics employs one or more of extraction rules and natural language processing techniques.

20. The non-transitory processor-readable storage medium of claim 15, wherein the rendering of the virtual environment using the generated at least one adaptation of the session of the virtual environment is provided only to a given user of a plurality of users.

* * * * *